INVENTOR
JAMES E. STAATS

July 29, 1969 J. E. STAATS 3,458,753
CROSSED-FIELD DISCHARGE DEVICES AND COUPLERS THEREFOR
AND OSCILLATORS AND AMPLIFIERS
INCORPORATING THE SAME
Filed Aug. 30, 1965 14 Sheets-Sheet 4

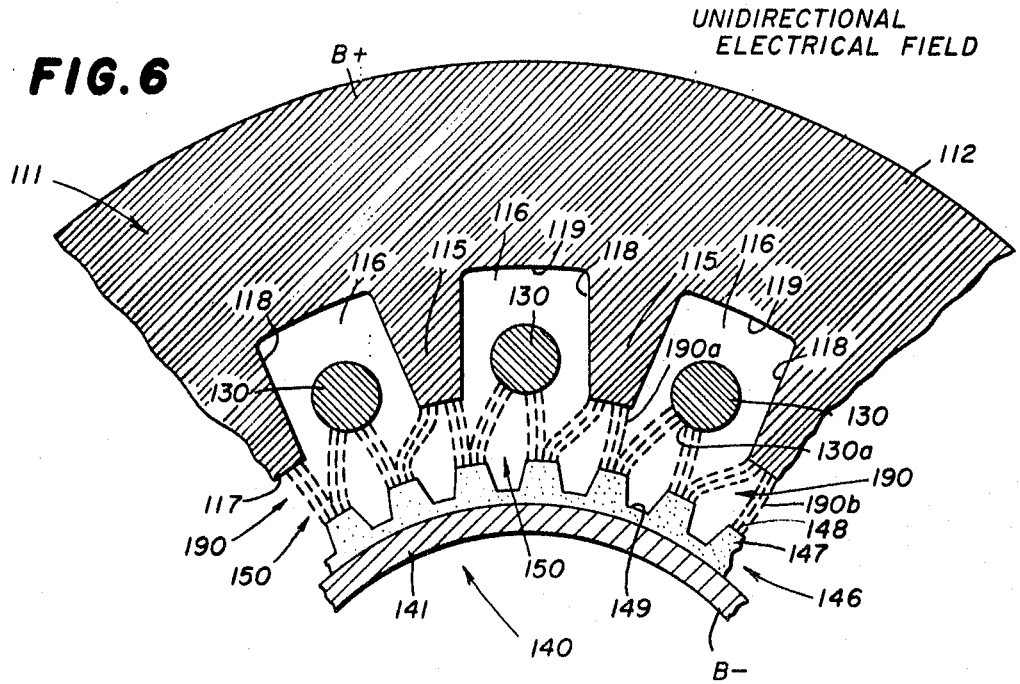
FIG. 6 — UNIDIRECTIONAL ELECTRICAL FIELD
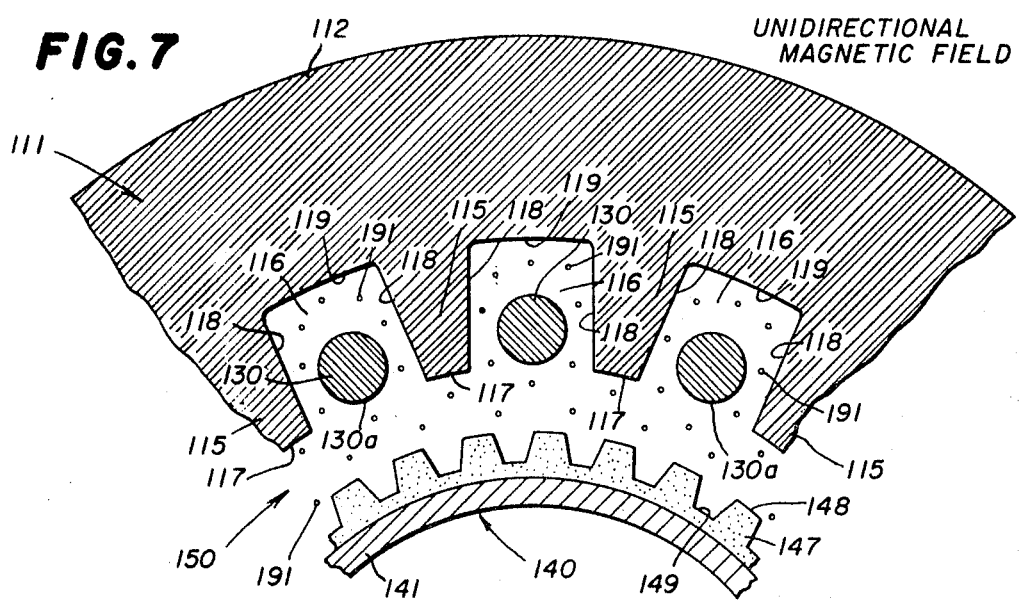
FIG. 7 — UNIDIRECTIONAL MAGNETIC FIELD

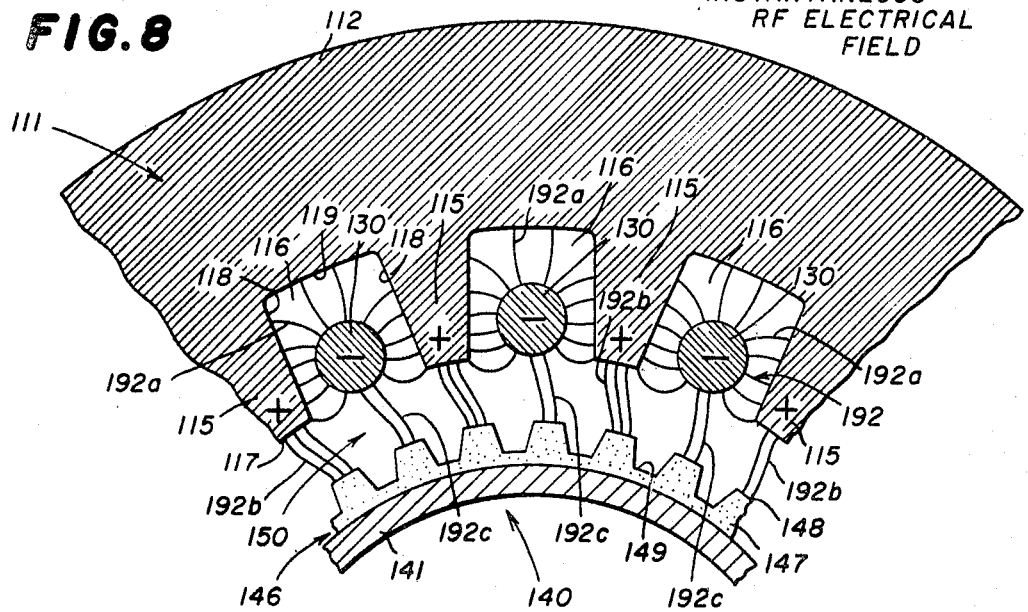
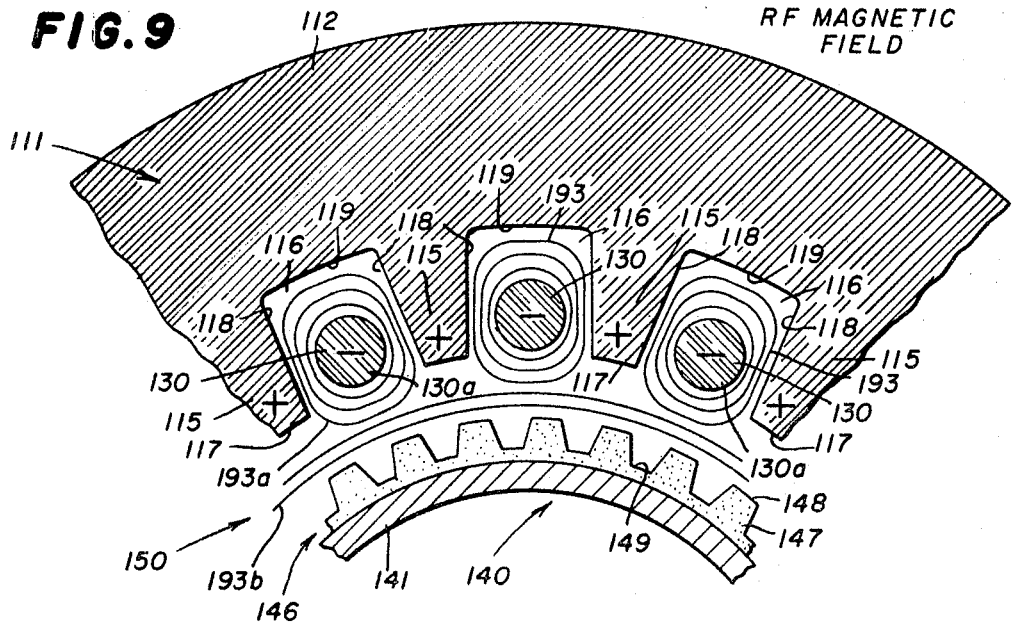

ELECTRON FLOW

COMPOSITE FIELDS

July 29, 1969                J. E. STAATS                3,458,753
           CROSSED-FIELD DISCHARGE DEVICES AND COUPLERS THEREFOR
                      AND OSCILLATORS AND AMPLIFIERS
                          INCORPORATING THE SAME
Filed Aug. 30, 1965                              14 Sheets-Sheet 13

FIG.18

United States Patent Office

3,458,753
Patented July 29, 1969

3,458,753
CROSSED-FIELD DISCHARGE DEVICES AND COUPLERS THEREFOR AND OSCILLATORS AND AMPLIFIERS INCORPORATING THE SAME
James E. Staats, Louisville, Ky., assignor to General Electric Company, a corporation of New York
Filed Aug. 30, 1965, Ser. No. 483,672
Int. Cl. H01j 25/34
U.S. Cl. 315—39.3          71 Claims

ABSTRACT OF THE DISCLOSURE

There is disclosed a crossed-field discharge device including a hollow anode structure and a cathode structure disposed therein and cooperating therewith to define an axially extending interaction space, the anode structure having axially extending anode recesses therein in which are mounted rods supported by and electrically connected to the anode structure, and a pair of end structures joining respectively the opposite ends of the anode structure and the cathode structure for mechanically supporting the same while providing electrical insulation therebetween; there also is disclosed a form of the device utilizing a tapered electron emissive surface and another form of the device wherein the output is capactively coupled to the cathode structure; there is further disclosed a coupler that permits connection of all of the DC potentials and withdrawals of the RF potentials using only three terminals on the device; finally there are disclosed oscillators and amplifiers incorporating the crossed-field discharge devices therein.

---

The present invention relates to improved crossed-field discharge devices, improved couplers therefor, and microwave circuits incorporating the same including microwave oscillator circuits and microwave amplifier circuits.

It is a general object of the invention to provide new and improved crossed-field discharge devices for use at microwave frequencies, which devices are of exceedingly simple and economical construction and arrangement, and which devices are particularly adapted for operation upon the application of relatively low voltage operating potentials thereto.

Another object of the invention is to provide improved crossed-field discharge devices of the type set forth which can provide a high output of microwave energy in proportion to the physical dimensions thereof, whereby to permit the miniaturization of microwave circuits embodying the improved crossed-field discharge devices of the present invention.

Another object of the invention is to provide a crossed-field discharge device of the type set forth including an anode structure extending and axially defining space having a plurality of axially extending anode segments thereon and projecting radially into the axially extending space and providing a corresponding plurality of axially extending anode recesses therebetween, a plurality of rods respectively spaced from the adjacent ones of the anode segments, means electrically interconnecting the anode structure and the rod at corresponding ends thereof, an axially extending cathode structure disposed in the axially extending space and cooperating with the anode structure to define an axially extending annular interaction space, the cathode structure including an electron emissive element disposed within the anode structure and adjacent to the inner portion of the interaction space, and end structures enclosing both the ends of the anode structure and the axially extending space, the anode structure and the rods and the interconnecting means defining a frequency determining resonant cavity for the device.

Another object of the invention is to provide an improved crossed-field discharge device of the type set forth, wherein the anode structure and the rods in the operation of the device cooperate to provide a portion of a coaxial transmission line accommodating an axially extending RF wave therein, and means is provided electrically interconnecting the anode structure and the rods at the adjacent corresponding ends thereof and terminating the coaxial transmission line provided thereby to define a frequency determining resonant cavity for the device.

In connection with the foregoing object, it is another object of the invention to provide an improved crossed-field discharge device of the type set forth, wherein pole pieces are provided at the opposite ends of the device and including portions overlying and in axial alignment with the anode recesses, wherein the rods are repsectively mounted on those portions of the pole pieces overlying the anode recesses.

Another object of the invention is to provide an improved crossed-field discharge device of the type set forth, wherein the radial distance between the outer surfaces of the cathode structure and the outermost portion of the adjacent one of the anode recesses is less than that required to accommodate a radial standing wave at the frequency of the resonant cavity.

Still another object of the invention is to provide an improved crossed-field discharge device of the type set forth, wherein the anode structure and the pole pieces and the cathode are symmetrical about a plane normal to the axis of the anode structure midway between the ends thereof.

Yet another object of the invention is to provide an improved crossed-field discharge device of the type set forth, wherein the cathode structure has spaced apart emissive portions thereon equal in number to the sum of the number of the anode sections and the number of the rods, each of the emissive portions having a circumferential extent of approximately 25% to 60% of the circumferential distance between the centers of the adjacent emissive portions, and the radial dimension of each of the emissive portions preferably being greater than about 20% of the spacing between the anode structure and the cathode structure.

In connection with the foregoing object, it is another object of the invention to provide an improved crossed-field discharge device of the type set forth, wherein the emissive portions on the cathode are symmetrically circumferentially located relative to the anode segments, and are preferably circumferentially displaced relative thereto between 0% and approximately 45% of the circumferential space between the adjacent anode segments, the preferred displacement being approximately 35% to 45%.

Another object of the invention is to provide an improved crossed-field discharge device of the type set forth, wherein the cathode structure has a conically shaped electron emissive element disposed within the anode structure and adjacent to the inner portion of the interaction space with the axis of the emissive element extending axially of the device, the preferred shape of the emissive element being a section of a regular right cone.

Yet another object of the invention is to provide an improved microwave oscillator incorporating therein a crossed-field discharge device of the present invention, the resonant circuit for the oscillator being between the anode structure and the rods and being positioned within the device.

In connection with the foregoing object, it is another object of the invention to provide an improved microwave oscillator of the type set forth wherein the resonant circuit is of the coaxial conductor type and has a wavelength corresponding to ½ of the wavelength of the resonant frequency thereof.

Another object of the invention is to provide an improved microwave amplifier incorporating therein a crossed-field discharge device of the present invention.

A further object of the invention is to provide an improved microwave coupling structure having a pair of RF input terminals for connection to a source of RF potential, a pair of DC input terminals for connection to a source of DC potential, a pair of output terminals for connection to a load for RF energy, means providing a DC connection between one of the DC input terminals and one of the RF input terminals, an RF rejection filter interconnecting the other of the DC input terminals and the other of the RF input terminals and providing the DC connection therebetween, and means capacitively connecting the RF input terminals respectively to the RF output terminals.

In connection with the foregoing object, it is another object of the invention to provide a microwave coupling structure of the type set forth and further including an RF by-pass filter connecting the DC input terminals.

A still further object of the invention is to provide a microwave coupling structure of the type set forth and comprising a plurality of coaxial transmission lines providing the various input and output connections thereof.

A still further object of the invention is to provide a microwave assembly including a crossed-field discharge device of the present invention in combination with the microwave coupling structure of the present invention.

Further features of the invention pertain to the particular arrangement of the parts whereby the above-outlined and additional operating features thereof are attained.

The invention, both as to its organization and method of operation, together with further objects and advantages thereof, will best be understood by reference to the following specification taken in connection with the accompanying drawings, in which.

Figure 3:
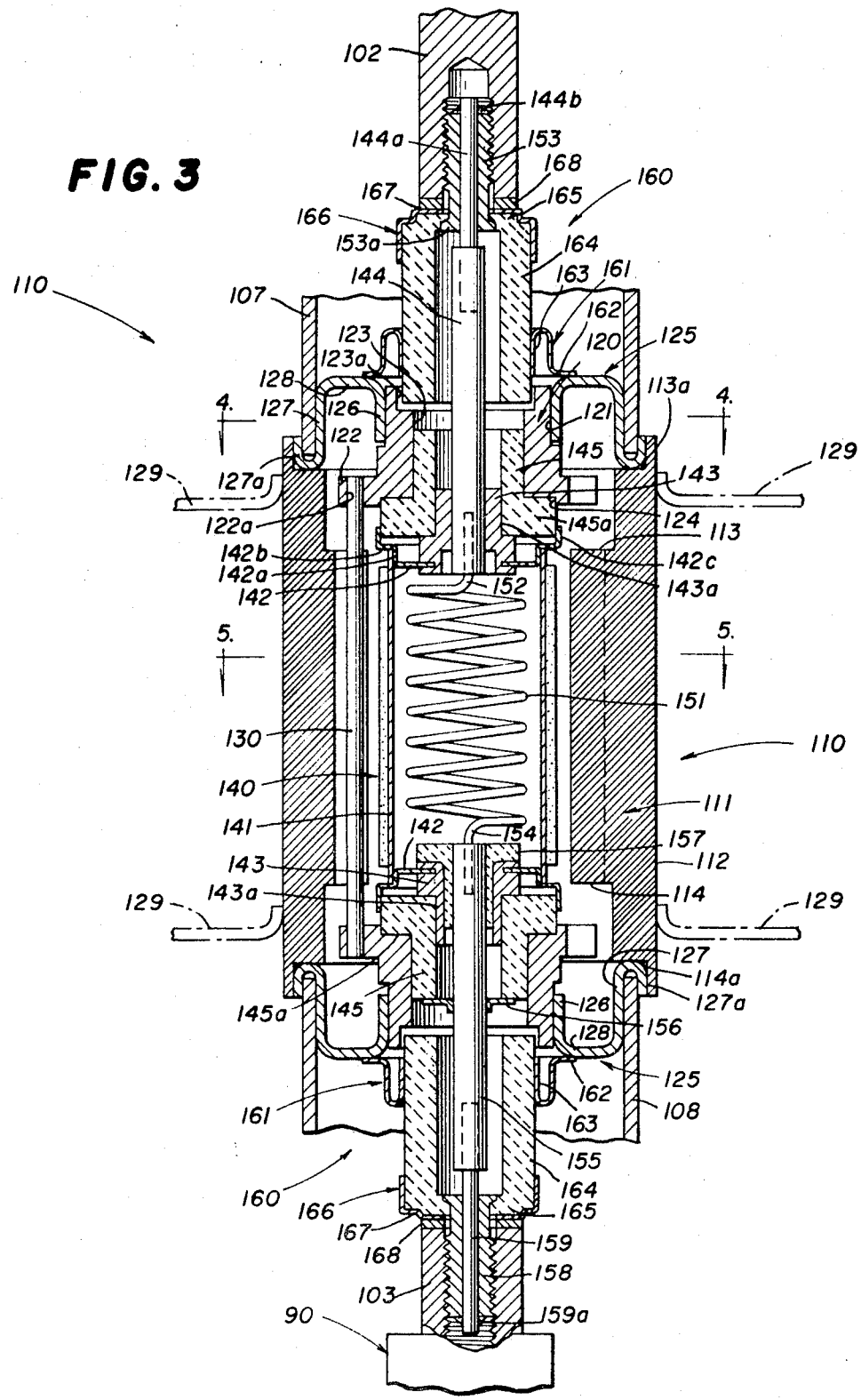
FIG. 3 is an enlarged view in vertical section through a first preferred form of crossed-field discharge device useful in the oscillator of FIG. 2.
Figure 4:
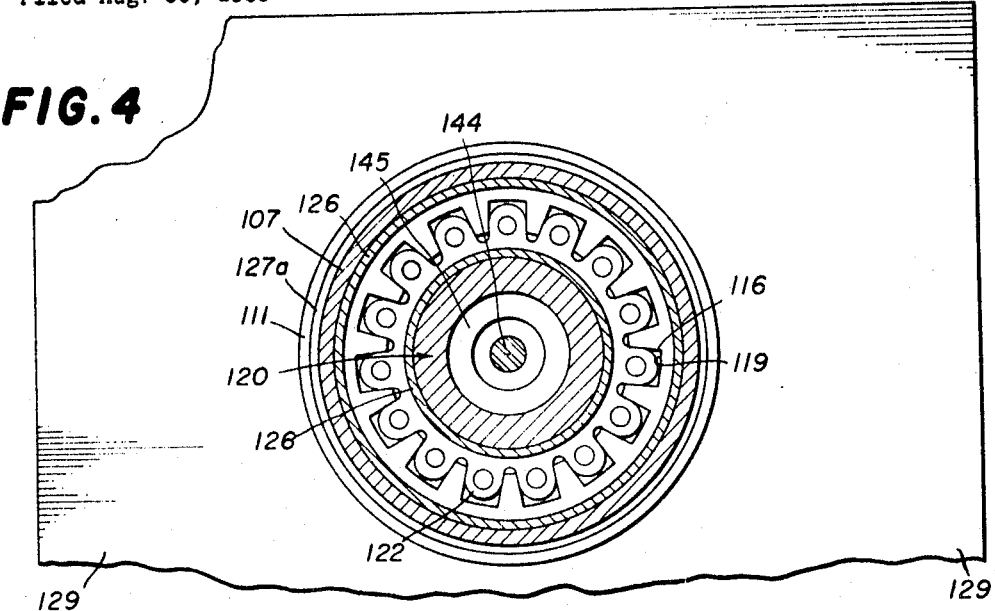
FIG. 4 is a view in horizontal section through the device of FIG. 3 along the line 4—4 thereof.
Figure 5:
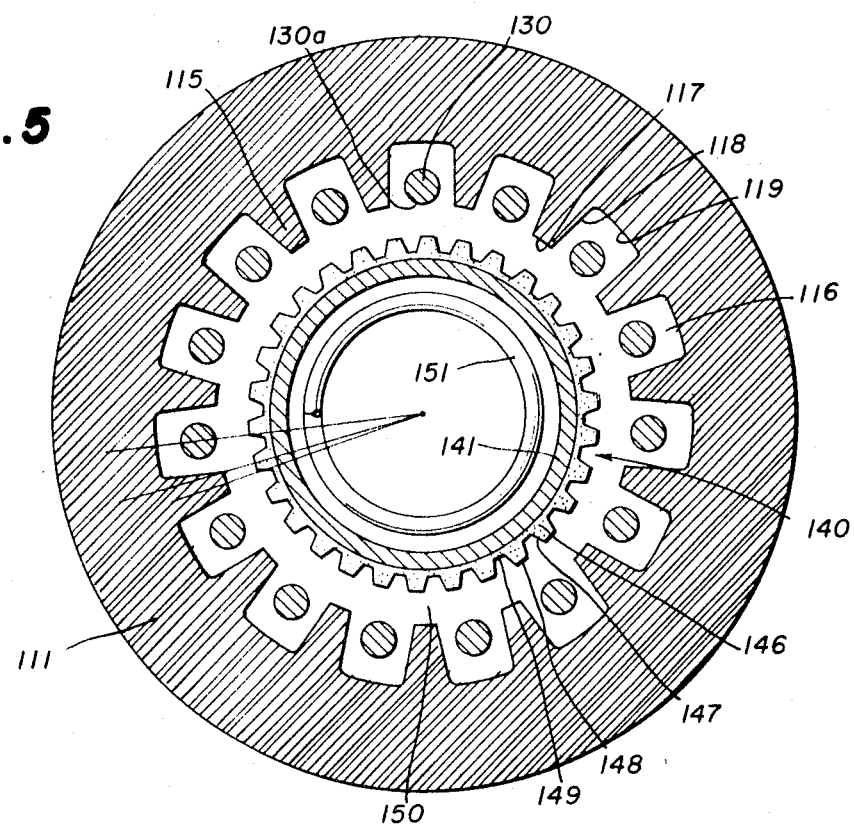
FIG. 5 is a further enlarged view in horizontal section through the device of FIG. 3 along the line 5—5 thereof.
Figure 12:
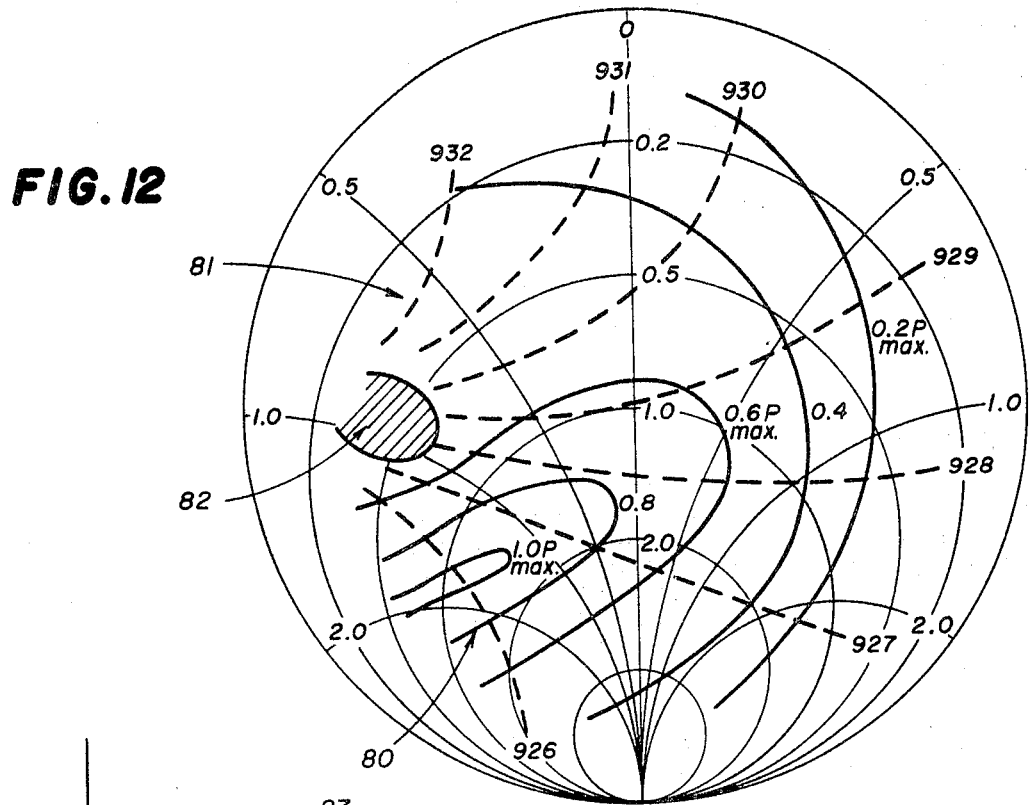
Figure 13:
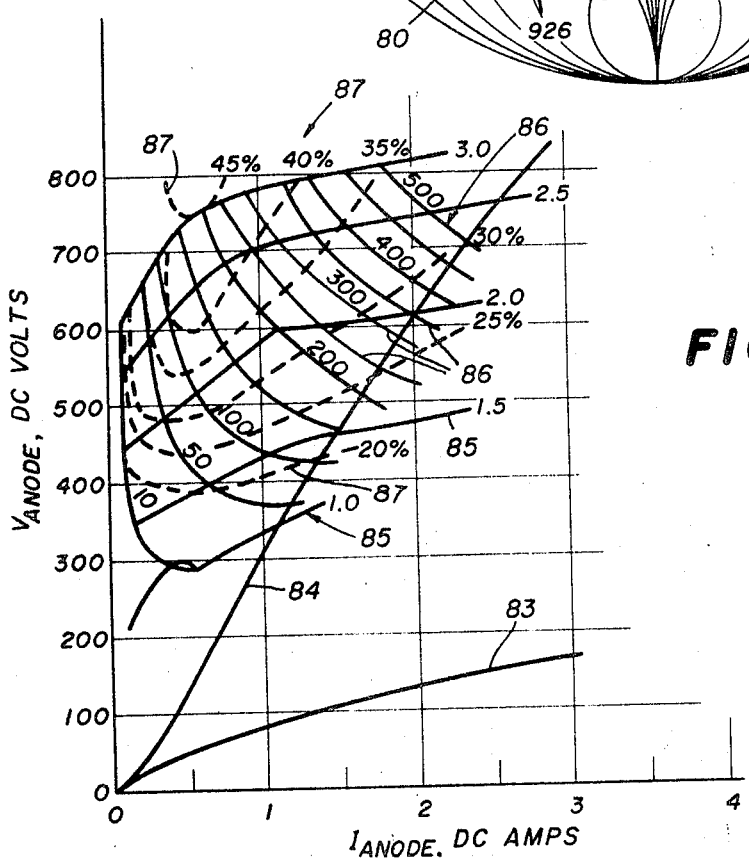
Figure 14:
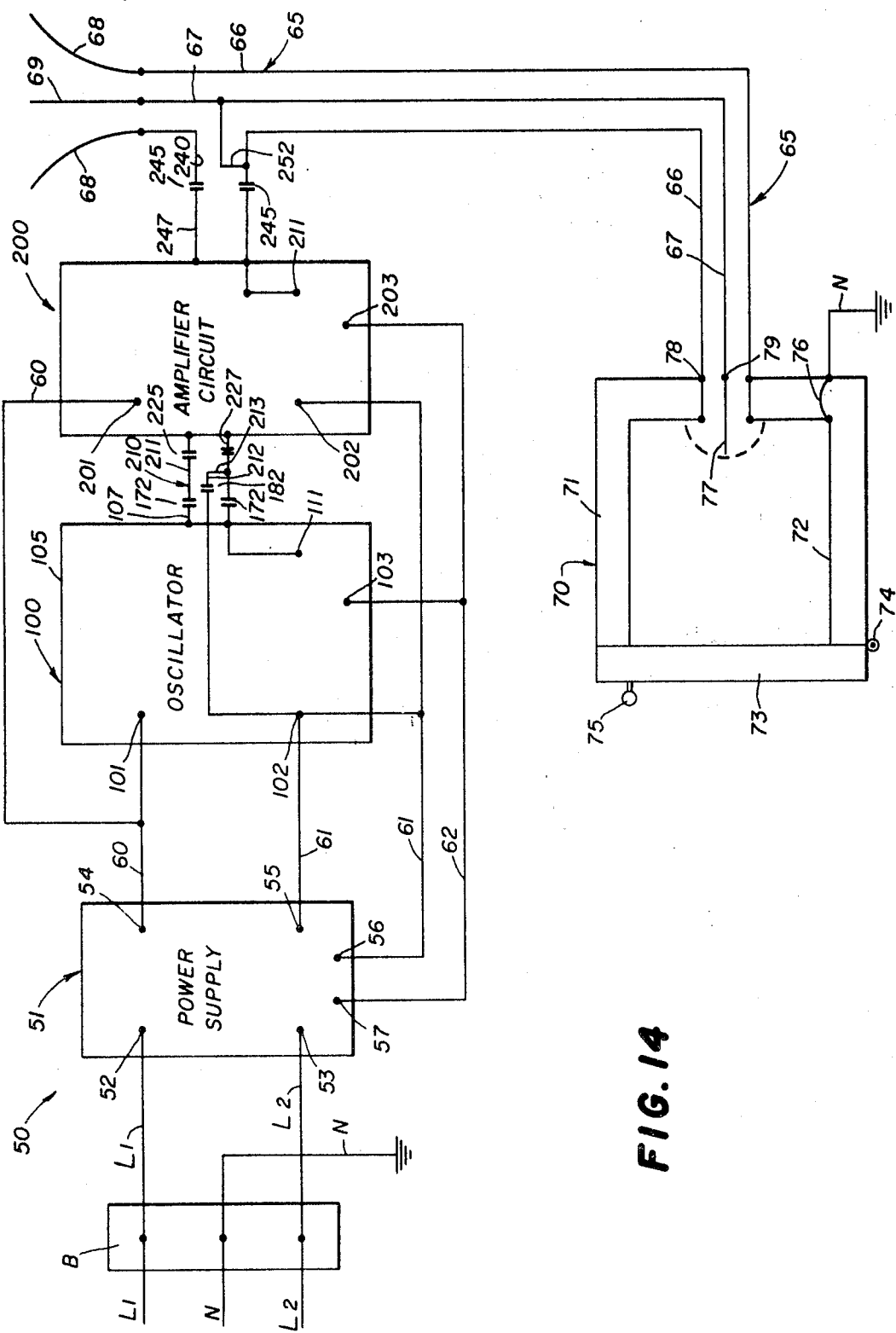
Figure 15:
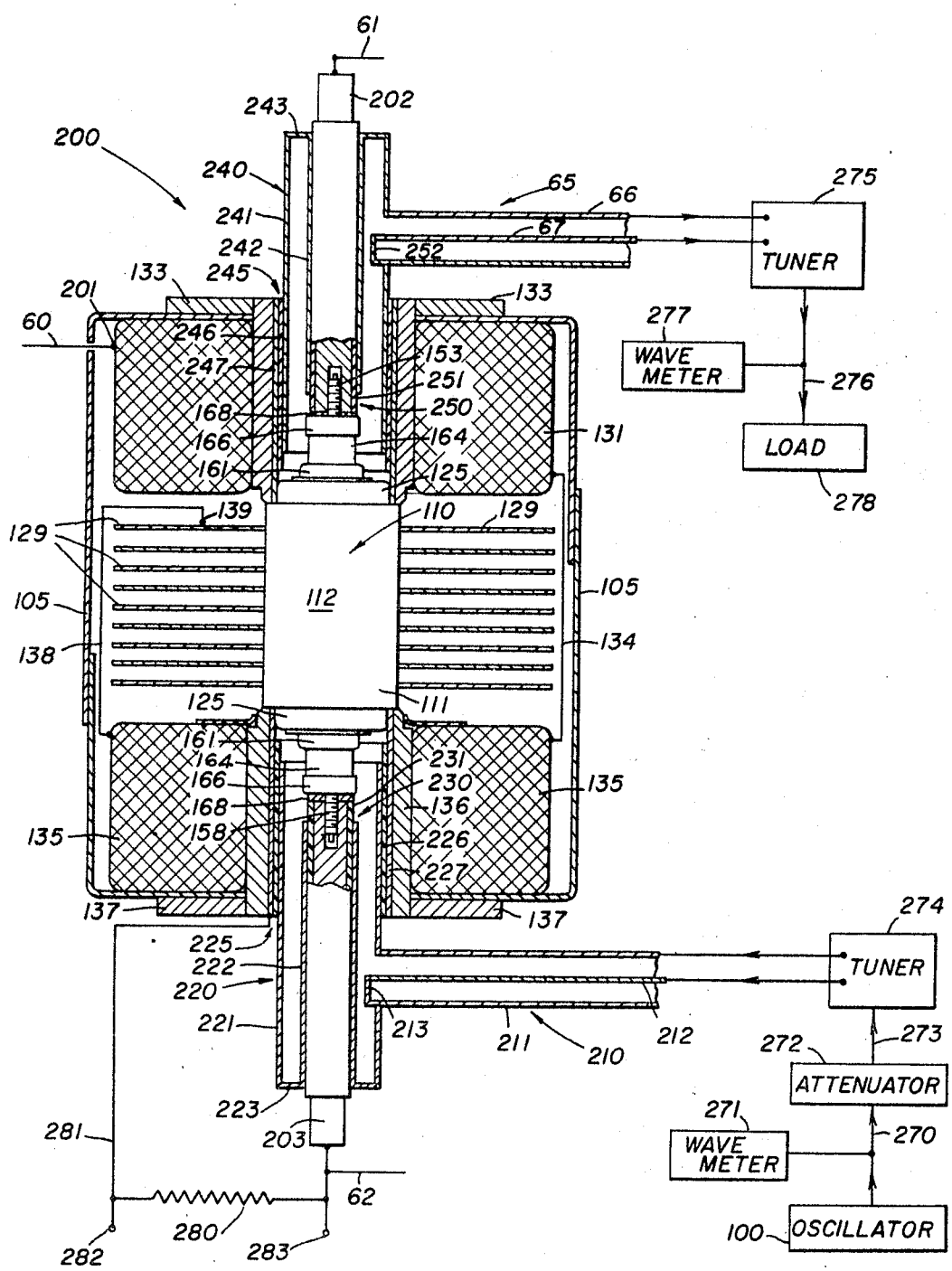
Figure 16:
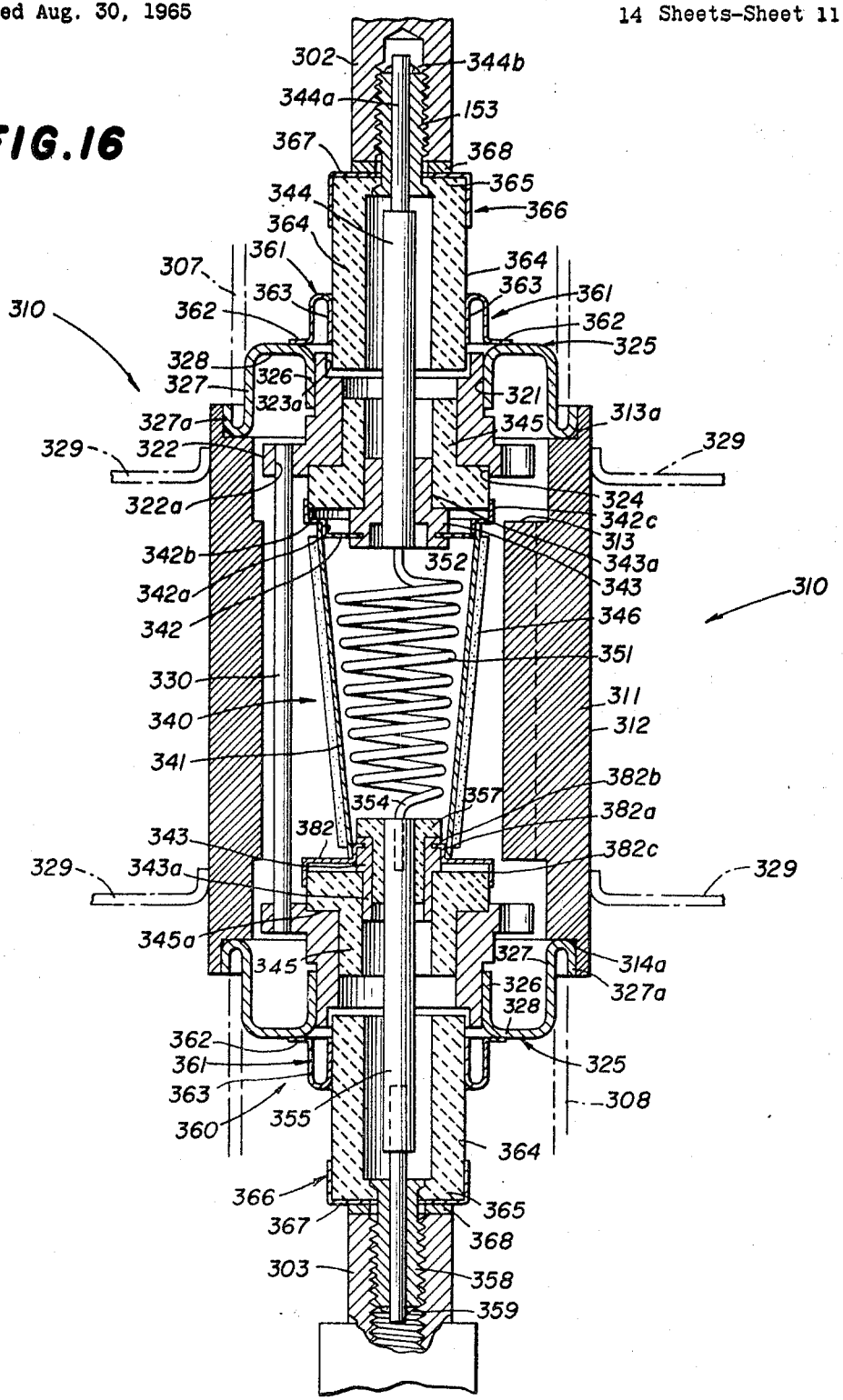
Figure 17:
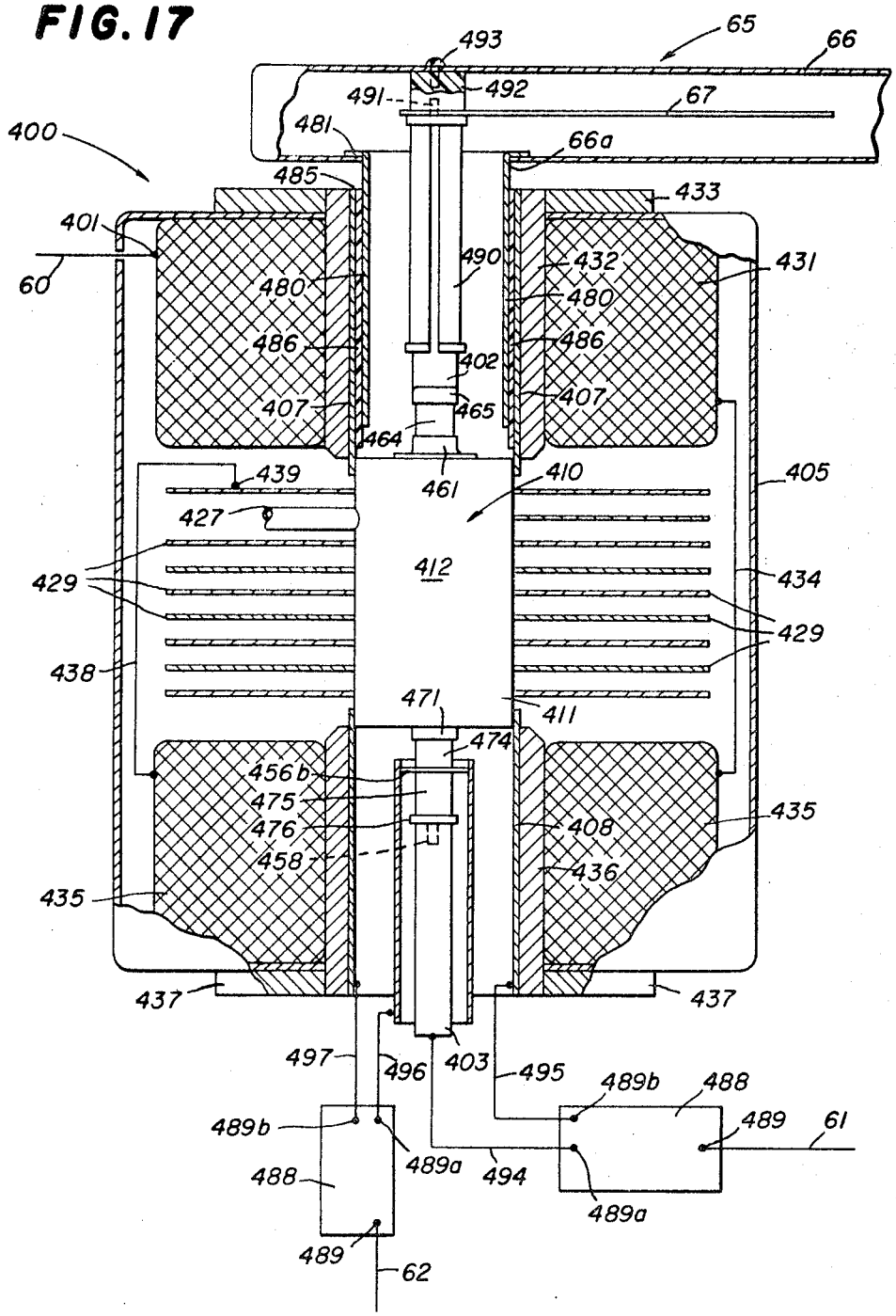
Figure 19:
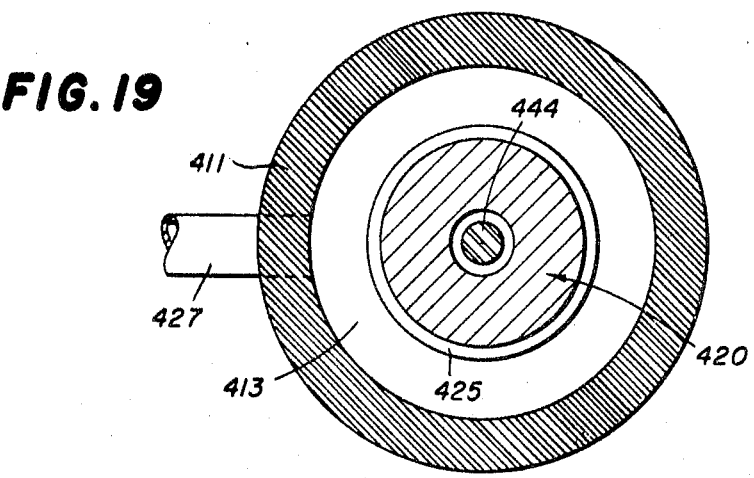
Figure 20:
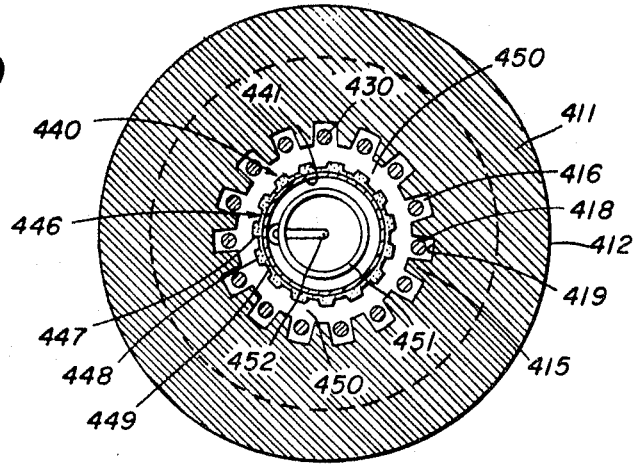
Figure 21:
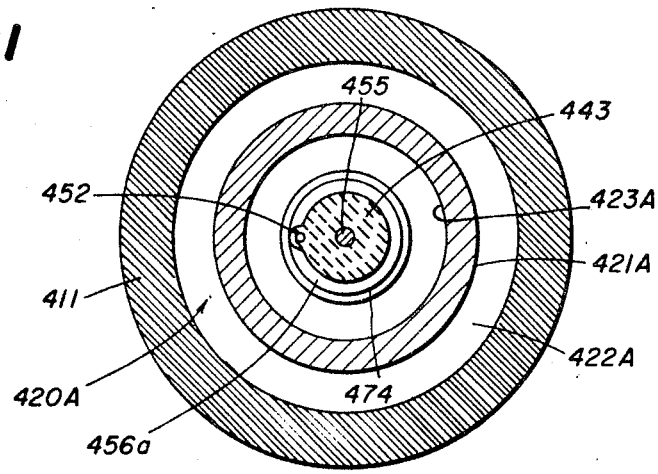

FIGS. 6 to 11, inclusive, are still further enlarged fragmentary views in horizontal section of a portion of FIG. 5 and illustrating the various electrical and magnetic fields present in the device of FIGS. 3 to 5 during the operation thereof;

FIGS. 12 and 13 are graphs plotting several operating characteristics of the crossed-field discharge device illustrated in FIGS. 3 to 5 of the drawings;

FIG. 14 is a schematic and diagrammatic illustration of an amplifying circuit for amplifying the output of the microwave oscillator, the amplifying circuit utilizing therein a crossed-field discharge device made in accordance with and embodying the principles of the present invention;

FIG. 15 is a view in vertical section through the amplifying circuit of FIG. 14 and illustrating the crossed-field discharge device and the circuit connections therefor including the magnetic field coils, the oscillator input circuits and the output circuits;

FIG. 16 is an enlarged view in vertical section through a modified form of the crossed-field discharge device illustrated in FIGS. 3 to 5;

FIG. 17 is a view in vertical section through a microwave oscillator incorporating therein a second preferred embodiment of the crossed-field discharge device made in accordance with and embodying the principles of the present invention;

FIG. 18 is an enlarged view in vertical section through the crossed-field discharge device in the oscillator of FIG. 17;

FIG. 19 is a view in horizontal section through the crossed-field discharge device of FIG. 18 along the lines 19—19 thereof;

FIG. 20 is a view in horizontal section through the crossed-field discharge device of FIG. 18 along the line 20—20 thereof; and FIG. 21 is a view in horizontal section through the crossed-field discharge device of FIG. 18 along the line 21—21 thereof.

Figure 1:
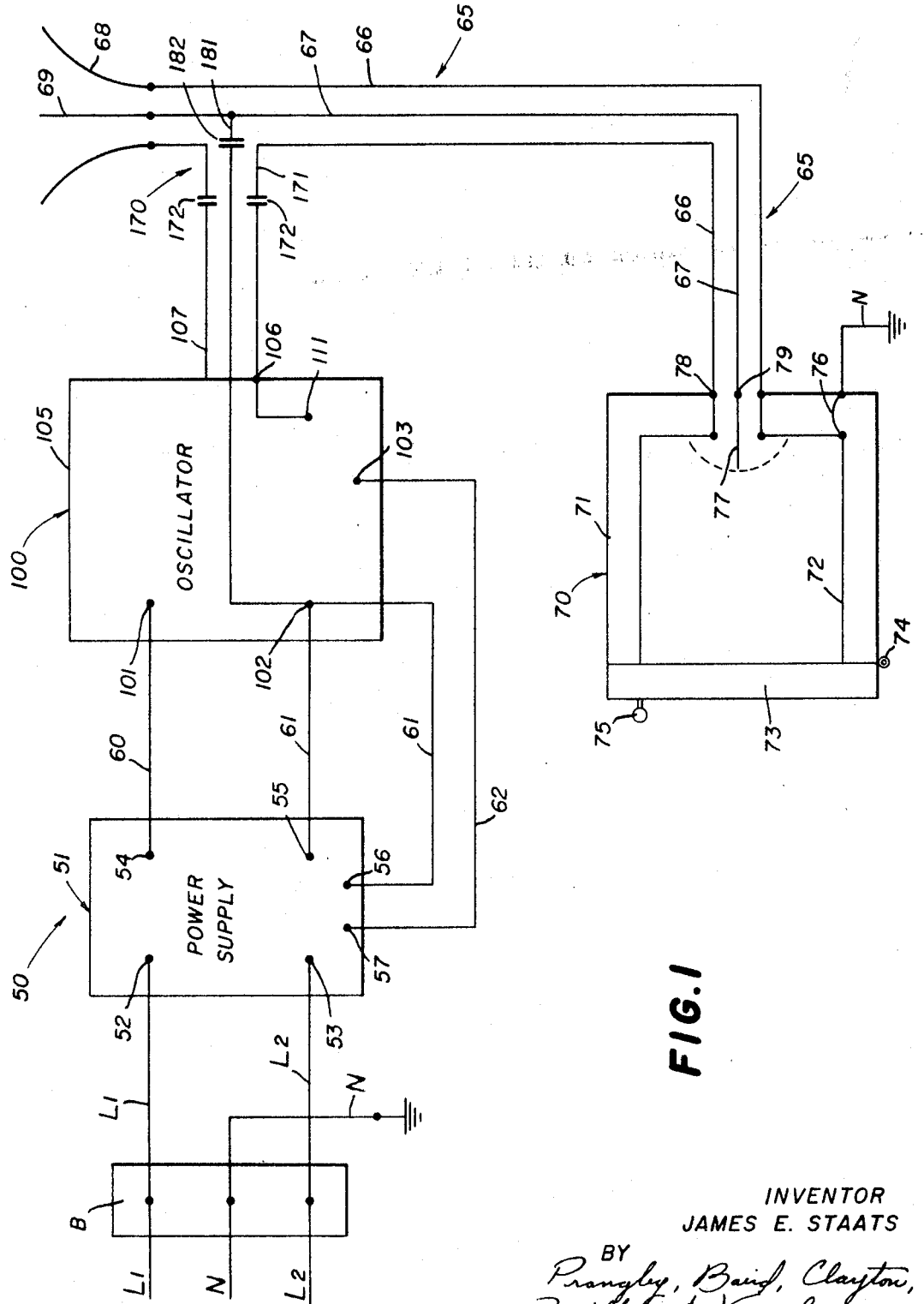
FIGURE 1 is a schematic and diagrammatic illustration of an oscillator circuit incorporating therein a crossed-field discharge device of the present invention.

Referring now to FIG. 1 of the drawings, there is diagrammatically illustrated an oscillator circuit 50 embodying the features of the present invention, the oscillator circuit 50 having been illustrated as connected to a 3-wire Edison network of 236 volts, single-phase 60-cycles, AC, and including two ungrounded line conductors L1 and L2 and a grounded neutral conductor N, the three conductors mentioned being terminated at an associated electrical insulating block B. The circuit 50 also comprises a power supply 51 having a pair of input terminals 52 and 53 that are respectively connected to the conductors L1 and L2. A first pair of output terminals 54 and 55 is provided for supplying a rectified and filtered DC voltage of low amplitude for supplying the DC operating potentials to the crossed-field discharge device of the circuit 50; and a second pair of output terminals 56 and 57 is provided for supplying a relatively low voltage AC power for the purpose of energizing the heater of the crossed-field discharge device of the oscillator circuit 50. More specifically, the input terminals 52 and 53 are connected to the output terminals 54 and 55 by a converter, the converter preferably being of the type disclosed in the copending application of James E. Staats, Ser. No. 181,144 filed Mar. 20, 1962, wherein there is disclosed a converter comprising an assembly of capacitor and rectifiers connected between the input terminal and output terminals thereof, and characterized by the production of a DC output voltage across the output terminals thereof in response to the application of a low frequency AC input therebetween across the input terminals thereof, wherein the amplitude of the DC output voltage from the converter is approximately twice the peak value of the AC voltage to the converter. The converter described is in fact a voltage doubler and rectifier circuit wherein the output DC potential therefrom at the terminals 54 and 55 is approximately 666 volts when the AC supply source has an R.M.S. voltage of 236 volts between the conductors L1 and L2, the 666 volts DC being the open circuit or no load value for the DC output from the power supply 51.

The oscillator circuit 50 further comprises an oscillator 100 incorporating therein a cross-field discharge device made in accordance with and embodying the principles of the present invention, the oscillator 100 having a pair of input terminals 101 and 102 that are connected respectively to the DC output terminals 54 and 55 of the power supply 51 by means of conductors 60 and 61, respectively; the input terminal 102 is also connected by the conductor 61 to one of the low voltage AC output terminals 56 of the power supply 51. A third input terminal 103 is provided for the oscillator 100, the input terminal 103 being connected by a conductor 62 to the other low voltage AC output terminal 57 of the power supply 51. As illustrated, all of the parts of the oscillator 100 are surrounded by a metallic casing 105 to which is connected as at 106 an outer tubular conductor 107 within which is disposed an inner conductor from the input terminal 102 that forms one of the output connections for the oscillator 100. Another output connection 111 is provided for the oscillator 100, the output connection 111 being connected to the metallic casing 105 by the connection 106 and thus to the outer conductor 107. Connection is made to an output transmission line 65 including an outer tubular conductor 66 and an inner conductor 67 disposed therein, a first capacitive coupling being provided by the coupler 172 between the outer conductor 107 and the outer conductor 66, and a second capacitive coupling being provided by the coupler 182 between the terminal 102 and the inner conductor 67. The capacitive coupling provided by the couplers 172 and 182 is desirable and necessary since for safety purposes it is necessary to ground the outer conductor 66 of the transmission line 65, which grounding of the outer conductor 66 is not possible if there is a DC connection to the oscillator casing 105, the casing 105 having a potential with respect to ground because of the application of operating potentials from the voltage doubler and rectifier circuit 51, it being inherent in the construction and operation of the circuit 51 that neither the conductor 60 nor the conductor 61 can be grounded. Accordingly, it is also necessary and desirable that the power supply 51 and the oscillator 100 be electrically shielded by a grounded outer housing (not shown) disposed therearound, all as is fully described in the aforementioned copending application Ser. No. 181,144.

The microwave energy supplied from the oscillator 100 to the transmission line 65 may be used for any desired purpose, two typical uses of the microwave energy being illustrated in FIG. 1, the first use being illustrated in the upper righthand portion of FIG. 1 and the second use being illustrated in the lower portion of FIG. 1. Referring to the upper righthand portion of FIG. 1, in the first use of the microwave energy illustrated therein the transmission line 65 is coupled to an antenna of the type commonly used in search radar, the outer conductor 66 being connected to the outer radiating or antenna elements 68 and the inner conductor 67 being connected to an inner radiating or antenna element 69, the antenna elements 68 and 69 serving to match the impedance of the transmission line 65 to the impedance of the atmosphere. In the second use of the microwave energy illustrated in FIG. 1, the transmission line 65 is shown coupled to an electronic heating apparatus, such as the electronic range 70 illustrated that is especially designed for home use. More particularly, the range 70 comprises an upstanding substantially boxlike casing 71 formed of steel and housing therein a metal liner 72 defining a heating cavity therein. The metal liner 72 may also be formed of steel, and essentially comprises a box-like structure provided with a top wall, a bottom wall, a rear wall and a pair of opposed side walls; whereby the liner 72 is provided with an upstanding front opening into the heating cavity defined therein, the casing 71 being provided with a front door 73 arranged in the front opening thus formed and cooperating with the liner 72. More particularly, the front door 73 is mounted adjacent to the lower end thereof upon associated hinge structure 74, and is provided adjacent to the upper end thereof with a handle 75, whereby the front door 73 is movable between a substantially vertical closed position and a substantially horizontal open position with respect to the front opening provided in the liner 72. Also the front door 73 has an inner metal sheet that is formed of steel and cooperates with the liner 72 entirely to close the heating cavity when the front door 73 occupies its closed position. For safety purposes, the inner liner 72 is connected by a conductor 76 to the outer casing 71 which is in turn grounded by the conductor N. The outer conductor 66 of the transmission line 65 is connected as at 78 to the casing 71 and the liner 72 of the range 70, and there is provided within the range 70 at the rear thereof a radiating element or antenna 77 that is connected as at 79 to the inner conductor 67 of the transmission line 65. Accordingly, the microwave energy within the transmission line 65 is radiated into the cooking cavity of the range 70 to provide the power for cooking materials disposed therein. It further will be understood that in a preferred embodiment of the range 70, the power supply 50 and the oscillator 100 therefor together with the transmission line 65 are all preferably disposed within a common housing that also includes the casing 71, the common housing being preferably formed of metal and grounded for safety purposes.

Further details of the construction of the oscillator 100 and the crossed-field discharge device 110 forming a part thereof will now be described with particular reference to FIGS. 2 to 5 of the drawings. The device 110 includes an anode 111, a pair of opposed pole pieces 120 having connected therebetween a plurality of rods 130, a cathode structure 140 and a pair of opposed end structures 160. The anode 111 is generally annular in shape and has a circular cross section, the outer wall 112 thereof being cylindrical, there being provided interiorly of the anode 111 an axially extending space. A first recess is provided in each end of the anode 111 terminating in opposed inner end walls 113 and 114, and a second larger diameter but shallower recess is formed in each end of the anode 111 and resulting in opposed outer end walls 113a and 114a, respectively. Provided on the inner surface of the anode 111 and extending between the opposed inner end walls 113 and 114 is a plurality of axially extending anode segments 115 that project radially inwardly into the axially extending space within the anode 111 and providing therebetween a corresponding plurality of axially extending anode recesses 116, fifteen of the anode segments 115 and fifteen of the corresponding recesses 116 being provided in the anode 111 as illustrated. Each of the anode segments 115 has an axially extending inner surface 117 and a pair of outwardly directed side walls 118 on the opposite sides thereof, the circumferential extent of the inner surface 117 being substantially less than the radial extent of the associated side walls 118. The outer ends of the side walls 118 are joined by an outer wall 119, whereby the recesses 116 are defined by the associated side walls 118 and the associated outer wall 119, the side walls 118 of each recess 116 being disposed substantially parallel to each other and substantially normal to the associated outer wall 119, whereby each of the recesses 116 is substantially square in cross section. The anode 111 is formed of a metal having good electrical conductivity and good thermal conductivity, the preferred material of construction being copper.

Figure 2:
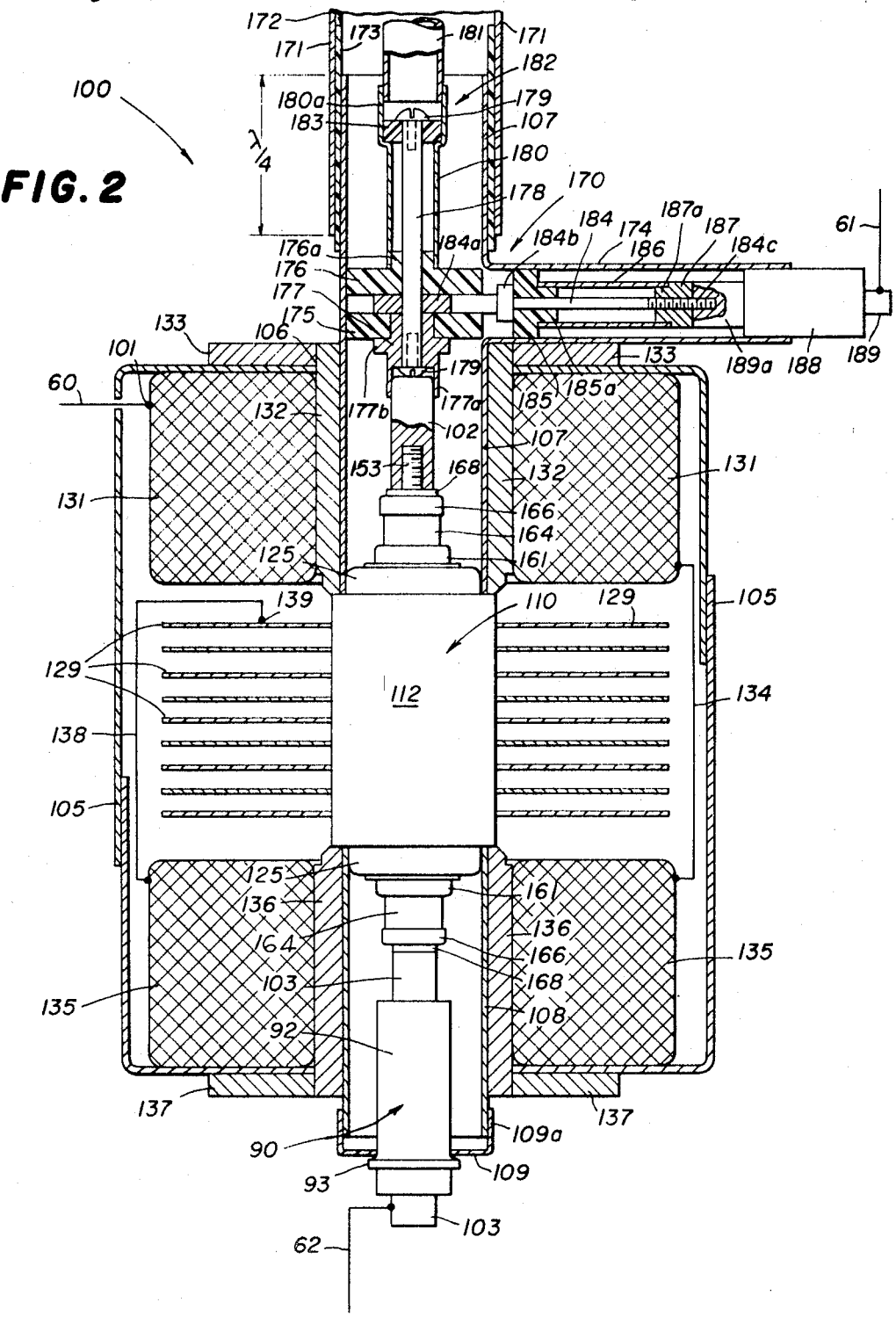
FIG. 2 is a view in vertical section through the oscillator of FIG. 1 and illustrating the circuit connections for the crossed-field discharge device including the magnetic field coils therefor and the coupler and filter construction used therewith.

In order to remove heat from the anode 111 during the operation of the device 110, there is mounted upon the outer wall 112 of the anode 111 a stacked array of cooling fins 129, ten of the fins 129 being illustrated in FIG. 2 extending outwardly and radially with respect to the anode 111. The fins 129 are preferably formed of a good heat conducting material such as copper and are in both mechanical and heat transfer connection with the anode 111, the fins 129 preferably being brazed upon the outer wall 112 of the anode 111. The shape of the fins 129 is substantially rectangular so that they fit within the casing 105, there preferably being provided means for passing a cooling fluid, such as a stream of air, through the casing 105 and over the fins 129 to effect cooling thereof and a consequent removal of heat from the anode 111 and the other parts of the device 110 during the operation thereof.

Mounted adjacent to the outer ends of the anode 111 and spaced a short distance away from the inner end walls 113 and 114, respectively, are the pole pieces 120, the pole pieces 120 being identical in construction, whereby the same reference numerals have been applied to like parts of both of the pole pieces 120. The pole pieces 120 are formed of a material having a high magnetic permeability, such as soft iron, and are copper plated to render the outer surfaces thereof highly conductive to RF energy. As illustrated, each of the pole pieces 120 is generally cylindrical in shape having a cylindrical outer surface 121 on the inner end of which is provided a plurality of outwardly extending projections 122, there being fifteen of the projections 122 equiangularly disposed about the associated pole piece 120 and overlying an associated anode recess 116 (see FIG. 4), whereby each of the projections 122 overlies and is in axial alignment with an associated recess 116 in the anode 111. Formed in each of the projections 122 is an opening 122a receiving therein the associated end of one of the rods 130, the asociated rod 130 being firmly secured to the associated projections 122, whereby each of the rods 130 extends between and is connected to and supported by a pair of aligned projections 122 on the opposed pole pieces 120. The rods 130 are preferably formed of a nichrome alloy and are copper plated to improve the RF conductivity of the exposed surfaces thereof. As illustrated, the rods 130 are cylindrical in shape and circular in cross section, the diameter of each of the rods 130 being approximately equal to ½ of the dimensions of an associated recess 116, each of the rods 130 being disposed midway between the side walls 118 of the associated recess 116 and being disposed with the inner surface 130a thereof positioned radially outwardly a slight distance from a surface on which would lie the inner surfaces 117 of the anode segments 115, the rods 130 being disposed radially outwardly a distance of approximately 0.005 inch in a typical construction, whereby each of the rods 130 is essentially disposed within the associated recess 116 and the outer ends thereof extend into and are fixedly secured to the associated projections 122 on the pole pieces 120.

Interconnecting each of the pole pieces 120 and the associated end of the anode 111 is an end cap 125 extending therebetween and hermetically sealing the space therebetween. Each of the end caps 125 includes an inner cylindrical portion 126 that snugly fits around the cylindrical wall 121 on the associated pole piece 120 and is fixedly secured thereto by brazing. An outer cylindrical wall 127 is spaced from the inner cylindrical wall 126 and is connected thereto by an end wall 128, the inner end of the wall 127 carrying an upturned flange 127a thereon which fits within and abuts against the outer associated end wall 113a or 114a on the anode 111, and is fixedly secured thereto as by brazing. The end cap 125 is formed of a magnetic metal having good electrical conductivity, the preferred metal being copper plated steel.

The pole pieces 120 arranged adjacent to the opposite ends of the anode 111 are utilized for establishing a unidirectional magnetic field extending axially through the space within the anode 111, and specifically through the interaction space 150 defined between the anode 111 and the cathode 140. To this end a pair of magnet coils 131 and 135 is provided, the magnet coil 131 being disposed about the upper end of the device 110 as viewed in FIG. 2 and the magnet coil 135 being disposed about the lower end of the device 110 as viewed in FIG. 2. The coils 131 and 135 are each shaped as a torous, are wound of electrically conductive wire, and as illustrated, are disposed respectively about magnet yokes 132 and 136 that are in the form of cylinders each disposed within the opening in the associated coil. There further are provided outwardly extending flanges 133 and 137, respectively, on the yokes 132 and 136, the casing 105 being disposed within the flanges 133 and 137 and forming a mechanical connection and a good magnetic path therebetween. It will be understood that the pole pieces 120, the magnetic yokes 132 and 136, the flanges 133 and 137, and the casing 105 are all formed of metals having a high magnetic permeability, such as iron and steel, whereby when the magnet coils 131 and 135 are energized, a strong and uniform unidirectional magnetic field is established between the pole pieces 120 within the device 110 and extending axially through an interaction space 150 therein.

The circuit for the energizing of coils 131 and 135 can be traced with reference to FIGS. 1 and 2 from the power supply 51, and specifically the DC output terminal 54 thereof through the conductor 60 to the input terminal 101 of the oscillator 100 to which is connected one terminal of the magnet coil 131. The other terminal of the magnet coil 131 is connected by a conductor 134 to one terminal of the magnet coil 135 and the other terminal of the magnet coil 135 is connected by a conductor 138 to one of the cooling fins 129 by means of a connection 139, whereby the input terminal 101 is connected via the magnet coil 131, the conductor 134, the magnet coil 135 and the conductor 138 to the anode 111 of the device 110. The flow of current through the magnet coils 131 and 135 serves to produce the unidirectional magnetic field in the interaction space 150 of the crossed-field discharge device 110.

The cathode structure 140 is provided in the axially extending space defined by the anode 111, the cathode structure 140 including a cylindrical wall 141 arranged with the axis thereof disposed at the axis of the anode 111, the wall 141 being formed of a heat resistant and electrically conducting material, the preferred material of construction being nickel. Mounted on and substantially closing the opposite ends of the wall 141 are two end walls 142, the end walls 142 being identical in construction, whereby the same reference numerals have been applied to like parts of both. The end walls 142 each includes an axially extending flange 142a that fits within and is preferably connected to as by welding the adjacent end of the wall 141, an outwardly directed flange 142b integral with the flange 142a and an axially extending flange 142c disposed about the outer edge of the flange 142b and disposed essentially parallel to and disposed outwardly with respect to the wall 141. The end walls 142 are also formed of a heat resistant and electrically conducting material, the preferred material of construction being nickel. The upper end wall 142 as seen in FIG. 3 has a centrally disposed opening therein in which is disposed a bushing 143 having an opening therein centrally thereof and having the axis thereof in alignment with the axis of the anode 111, a conductor 144 extending outwardly with respect to the bushing 143. The bushing 143 is formed of a material having a good electrical conductivity, such as copper, and is both mechanically and electrically secured to the associated end wall 142 and the conductor 144. The end wall 142 at the lower end of the cathode 140 likewise has an opening centrally thereof and receives therein a bushing 143 that is formed of a metal having good electrical conductivity, such as copper, the end wall 142 and the bushing 143 being mechanically and electrically connected to each other. In order mechanically to mount the cathode structure 140 with respect to the anode 111 and the rods 130 while maintaining electrical insulation with respect thereto, each of the bushings 143 has a reduced diameter portion 143a that is received within an opening in an associated annular insulator 145, preferably formed of ceramic, the insulator 145 in turn fitting within a cylindrical opening 123 in the associated pole piece 120. The inner ends of the insulators 145 carry radially and outwardly extending flanges 145a that fit within and are received in telescoping relationship with the flanges 142c on the outer edges of the cathode end walls 142; further the flanges 145a are received within an annular recess 124 in the adjacent end of the associated pole piece 120. As a consequence of the cooperation among the pole pieces 120, the end wall flanges 142c, the insulators 145 and the outwardly extending flanges 145a thereof, the cathode structure 140 is firmly and fixedly mounted with respect to the pole pieces 120 and the rods 130 carried thereby, while being fully electrically insulated therefrom.

The cathode wall 141 is provided with a sintered porous coating 146 impregnated with a suitable electron emissive oxide material, whereby upon heating of the cathode structure 140, the coating 146 readily emits electrons from the outer surface thereof. Referring particularly to FIG. 5, it will be seen that the coating 146 is shaped to provide a plurality of outwardly extending projections 147 each having outwardly converging side walls joining a generally circumferentially arranged outer surface 148, a space 149 being provided between adjacent projections 147. As illustrated, the circumferential extent of the outer surfaces 148 is substantially equal to the spacing 149 between adjacent projections 147. The preferred range of the circumferential extent of each of the outer surfaces 148 is approximately 25% to 60% of the circumferential distance between the centers of adjacent outer surfaces 148. The radial dimension of each of the projections 147 is also preferably greater than about 20% of the spacing between the anode 111 and the coating 146 on the cathode structure 140. The number of the projections 147 provided on the coating 146 is equal to the sum of the number of anode segments 115 and the number of the rods 130, whereby there are thirty of the projections 147 provided upon the coating 146. The outer surfaces of the coating 146 together with the inner surfaces of the anode 111 define an interaction space 150 disposed therebetween in which the emitted electrons from the coating 146 interact with the electrical fields and the magnetic fields disposed between the anode 111 and the cathode structure 140. As will be described more fully hereinafter, the projections 147 combine with the anode segments 115 and the rods 130 to provide a preferred distribution of the several fields within the interaction space 150 of the device 110 that results in more desirable operating characteristics thereof. One particularly desirable result of the shape of the coating 146 as described is the minimized back heating of the cathode structure 140, the desirable emitted electrons emanating from the projections 147, and the undesirable emitted electrons emanating from the space 149 between the projections 147, thereby to facilitate the emission of desirable electrons and to suppress the emission of undesirable electrons.

It further will be noted from FIG. 5 that the center line of each projection 147 is circumferentially displaced relative to the center line of its corresponding anode segment 115 or rod 130, as the case may be; more specifically, the center lines of the projections 147 are displaced in a clockwise direction a circumferential distance equal to approximately 40% of the circumferential spacing between the center lines of an adjacent anode segment 115 and an adjacent rod 130. The circumferential displacement of the projections 147 with respect to the corresponding anode segment 115 or rod 130 is preferably in the range between 0% and approximately 45% of the circumferential spacing between adjacent anode segments and rods, a preferred range being between approximately 25% and 45% of the spacing between adjacent anode segments and rods, a still more preferred range being between approximately 35% and 45% of the spacing between adjacent anode segments and rods. Furthermore, the displacement is on the downstream side, i.e., in the direction of normal initial electron flow from the projections 147. Finally, it will be noted that the electron emissive coating 146 is confined between the end walls 113 and 114 of the anode 111, the cathode structure 140 being carefully centered with respect to the anode structure 111 and the rods 130, whereby each of the cathode projections 147 extends axially of the device 110 parallel to the axis thereof and confined between the end walls 113 and 114.

As illustrated, the cathode structure 140 is of the indirectly heated type, and accordingly, there has been provided within the cathode wall 141 a heater 151 in the form of a coiled filament extending substantially the entire length of the cathode wall 141 and spaced inwardly a short distance from the inner surface thereof. The upper end of the heater 151 as viewed in FIG. 3 has an outer end 152 that extends outwardly into an opening in the lower end of the conductor 144 and is mechanically and electrically connected thereto, whereby the cathode structure 140 and the heater 151 are both mechanically and electrically connected to the conductor 144. The lower end of the heater 151 has an outer end 154 that extends into an opening in the upper end of a conductor 155 and is mechanically and electrically secured thereto. The conductor 155 is preferably formed of copper and extends downwardly through and spaced from the bushing 143 and through and spaced from the insulator 145 and outwardly beyond the lower end cap 125. A fastener 156, such as a lock nut, surrounds the conductor 155 and abuts against the lower end of the insulator 145 to position the conductor 155 with respect thereto. There further is provided an insulating bushing 157, formed preferably of ceramic, that surrounds the upper end of the conductor 155 and is disposed between the conductive bushing 143 and the conductor 155 to provide electrical insulation therebetween. The lowermost end of the conductor 155 as illustrated is connected to a connector 158 by means of a conductor 159 extending therebetween, whereby the connector 158 is in good electrical connection with the lower end of the heater 151 for supplying electrical energy thereto, but is electrically insulated from the lower end of the cathode structure 140.

A pair of identical end structures 160 is provided at the opposite ends of the device 110, the end structures 160 serving to provide a hermetic seal between the end cap 125 and the conductor 144 at the upper end of the device 110 as viewed in FIG. 3, and a hermetic seal between the end cap 125 and the conductor 155 at the lower end of the device 110. Since the end structures 160 are identical in construction, only one will be described in detail, like reference numerals being applied to like parts of both of the end structures 160. A first seal member 161 is provided formed of a good electrical conducting material that is non-magnetic, the preferred material being "Fernico" alloy, a typical composition being 54% iron, 28% nickel and 18% cobalt, the material also being of the type that can be readily secured both to a metal surface and a ceramic surface. The seal member 161 is generally cylindrical in shape and has an outwardly directed flange 162 on the lower end thereof that rests upon the exposed end of the adjacent end cap 125 and is hermetically sealed thereto as by brazing. An inturned and re-entrantly directed flange 163 is formed on the seal member 161 and completely surrounds an associated insulator 164 that surrounds the outer end of the associated conductor 144 or 155, as the case may be, the insulators 164 preferably being formed of ceramic. The flange 163 is hermetically sealed to the exterior cylindrical surface of the associated insulator 164, whereby to form a hermetic seal between each end cap 125 and the associated insulator 164 and to provide mechanical interconnection therebetween as well as providing electrical insulation therebetween. The outer end of each of the insulators 164 has an inwardly directed flange 165 thereon that engages the associated connector 153 or 158, as the case may be, and each end is provided with a seal member 166 generally cylindrical in shape and surrounds the outer end of the associated insulator 164. Both of the seal members 166 are formed of a good electrical conducting material that is non-magnetic, the preferred material being "Fernico" alloy, the material also being of the type which can be readily hermetically sealed both to a metal surface and to a ceramic surface. Each of the seal members 166 surrounds and embraces the adjacent end of the associated insulator 164 and is hermetically sealed thereto. The outer end of each of the seal members 166 carries an inwardly directed flange 167 that overlies the outer end of the associated insulator 164 and surrounds and embraces the shank of the associated connector 153 or 158 and is hermetically sealed thereto, whereby each seal member 166 hermetically seals between the associated insulator 164 and the associated connector 153 or 158. It will be understood that each structure 160 hermetically seals the associated end of the device 110 and also provides electrical insulation between the parts where necessary while providing for mechanical support therebetween.

Referring now to FIG. 2 of the drawings, the manner in which the crossed-field discharge device 110 is incorporated in the oscillator 100 will be described in further detail. A tubular conductor 107 is provided formed of a material that is electrically conductive, the preferred material being aluminum metal; the conductor 107 has an internal diameter substantially equal to the external diameter of the adjacent end cap wall 127 (see FIG. 3 also) and is placed in telescoping relation therewith and is electrically connected thereto, the conductor 107 also being disposed within the upper magnetic yoke 132 and extending upwardly and beyond the upper end thereof. As is illustrated in both FIGS. 2 and 3, the connector 153 at the upper end of the crossed-field discharge device 110 has the outer external surfaces thereof threaded and extends into a complementarily threaded opening in the lower end of the terminal 102, whereby a good electrical connection is provided between the connector 153 and the terminal 102, a lock washer 168 preferably being disposed between the lower end of the terminal 102 and the flange 167 on the seal member 166. The upper end of the terminal 102 is disposed below the outer end of the associated magnetic yoke 132.

The terminal 102 and the conductor 107 form a coaxial transmission line that provides output RF terminals for the oscillator 100, the terminals having applied therebetween the output RF energy from the oscillator 100. In addition, the outer conductor 107 has applied thereto the B+ potential from the conductor 60 which is connected thereto via the input terminal 101, the magnet coil 131, the conductor 134, the magnet coil 135, the conductor 138, the connection 139, the uppermost cooling fin 129, the anode 111 and the end cap 125, the end cap 125 being directly connected to the lower end of the outer conductor 107 as illustrated. Accordingly, it will be seen that the outer conductor 107 not only serves as one of the RF terminals from the device 110 but also is in direct electrical connection with the B+ potential on the anode 111. Likewise, the terminal 102 not only has RF output energy thereon but has applied thereto both the B− potential for the cathode 140 of the device 110 and the low voltage AC potential for energizing the heater 151.

In order to accommodate the application to and the presence of the various potentials named on the output terminals 102 and 107 while preventing the introduction of RF energy into the power supply 51, and while preventing the application of the B+ and B− potentials to the output transmission line 65, there has been provided an improved coupler and filter structure 170 of the present invention. Referring to FIG. 2, it will be seen that the coupler and filter structure 170 includes a first RF output terminal in the form of an annular outer conductor 171 which is capacitively coupled to the conductor 107 by a coupler 172, the coupler 172 including a sleeve 173 of electrically insulating dielectric material, the sleeve 173 preferably being formed of a synthetic organic plastic resin, the preferred resin being a tetrafluoroethylene resin sold under the trademark "Teflon." The insulating sleeve 173 is disposed around and firmly embraces the outermost end of the tubular conductor 107 and extends upwardly therebeyond; the lower end of the outer conductor 171 is in turn placed in telescoping relationship about the sleeve 173, the lower end of the conductor 171 telescopically overlapping the upper end of the conductor 107 for a distance equal to ¼ of the wavelength of the frequency of operation of the oscillator 100 in order to provide a portion of a second harmonic filter as will be described more fully hereinafter.

An opening is provided in the side wall of the conductor 107 adjacent to the upper end of the oscillator 100, and joining the conductor 107 and surrounding the opening in the side wall thereof is a second annular conductor 174 that is suitably secured as by welding to the conductor 107 and extends laterally therefrom and to the right as viewed in FIG. 2 with the longitudinal axes of the conductors 107 and 174 disposed substantially normal to each other. Disposed in the conductor 107 adjacent to the junction thereof with the conductor 174 is a pair of annular insulators 175 and 176 substantially filling the conductor 107 and spaced apart a short distance from each other, the insulators 175 and 176 being formed of an electrically insulating dielectric material, the preferred material being a synthetic organic plastic resin, the preferred resin being a tetrafluoroethylene resin sold under the trademark "Teflon." The lower insulator 175 has an opening centrally therein that receives therethrough a portion of a bullet 177, the bullet 177 having on the lower end thereof a plurality of spring fingers 177a that resiliently grip the upper end of the terminal 102 to form a good electrical contact and mechanical interconnection therewith, a laterally extending flange 117b extending around the bullet 177 and being disposed below and in supporting relationship with the insulator 175.

Extending upwardly through an opening in the center of the bullet 177 is a probe 178 in the form of a solid rod of electrically conductive material, the preferred material being copper. The probe 178 passes through an opening in the center of the insulator 176 and upwardly therebeyond, the insulator 176 having an upstanding flange 176a surrounding the probe 178. A suitable fastener such as a screw 179 is provided at the lower end of the probe 178 and threadedly engages a complementarily threaded opening at the lower end thereof, the head of the screw 179 overlying the lower surface of the bullet 177. Arranged about and in telescoping relationship with the upper end of the probe 178 is an annular inner conductor 180 that has the lower end resting upon the insulator 176 and surrounding the upstanding flange 176a thereon, the upper end of the conductor 180 having an enlarged section 180a thereon that extends upwardly well beyond the probe 178 and telescopically receives therein a second tubular inner conductor 181 that serves as an RF output terminal for the coupler and filter structure 170, whereby the conductors 171 and 181 provide the RF output terminals for the coupler and filter structure 170. A capacitive coupling is provided between the probe 178 and the conductors 180 and 181 by a coupler 182 including an annular washer 183 formed of an electrically insulating dielectric material, the preferred material being a synthetic organic plastic resin, the preferred resin being a tetrafluoroethylene resin sold under the trademark "Teflon." The washer 183 surrounds the upper end of the probe 178 and is seated in the enlarged portion 180a at the upper end of the conductor 180 and serves fixedly to position the upper end of the probe 178 with respect to the conductors 180 and 181. A second fastener in the form of a screw 179 is provided in the upper end of the probe 178 and has a threaded shank threadedly engaged in a complementarily shaped threaded opening in the upper end of the probe 178, the head of the screw 179 engaging the upper surface of the insulating washer 183, whereby the two opposed screws 179 serve fixedly to interlock the insulators 175 and 176, the bullet 177, the conductor 180 and the insulating washer 183.

The B− potential and the low voltage AC filament supplied for the device 110 are connected to the probe 178 and thus to the device 110 through connections in the conductor 174, and specifically through a conductor 184 disposed within and concentric with the outer conductor 174. The conductor 184 carries on the lefthand end thereof as viewed in FIG. 2 a connector 184a having an opening therein that receives therethrough the probe 178, whereby to make good electrical connection therewith. Disposed about the conductor 184 and between the outer conductor 174 and the inner conductor 184 is an annular insulator 185 formed of an electrically insulating dielectric material, the preferred material being a synthetic organic plastic resin, the preferred resin being a tetrafluoroethylene resin sold under the trademark "Teflon." Disposed to the left of the insulator 185 is an enlargement or flange 184b on the conductor 184, and disposed to the right of the insulator 185 is a cylindrical choke 186 in the form of a tubular conductor that surrounds and receives therethrough the conductor 184 arranged concentrically therewith, the insulator 185 having a laterally extending flange 185a surrounding the conductor 184 and extending into the lefthand end of the choke 186 to position the adjacent end of the choke 186 with respect to the conductor 184. A conductive nut 187 is provided about the conductor 184 adjacent to the righthand end thereof and including a flange 187a extending into the righthand end of the choke 186 to position the adjacent ends of the conductor 184 and the choke 186 with respect to each other. The righthand end of the conductor 184 is threaded as at 184c and threadedly engages an internally threaded opening in the nut 187 to lock the insulator 185 and the choke 186 against the flange 184b; the threaded end 184c is connected to an input terminal 189 formed of a conductive metal, the terminal 189 having an enlarged lefthand end 189a having a threaded opening therein to receive the adjacent threaded end 184c of the conductor 184. The terminal 189 extends outwardly to the right beyond the outer conductor 174 and is connected to the conductor 61 from the power supply 51. Connected between the outer conductor 174 and the inner conductor 189 is a filter capacitor 188 of the feed through type that is in the form of two layers of conductive foil between which are interposed layers of insulating film, the layers of conductive foil and insulating film being wound to form the capacitor 188, one terminal of the capacitor 188 being connected to the outer conductor 174 and the other terminal of the capacitor 188 being connected to the terminal 189.

As has been explained above, the inner conductor 107 and the outer conductor 171 telescopically overlap a distance equal to ¼ the wavelength of the frequency of operation of the oscillator 100. In addition, the probe 178, the inner conductor 180 and the choke 186 are also constructed to have a length equal to ¼ of the wavelength of the frequency of operation of the oscillator 100. In the operation of the coupler and filter structure 170, the outer conductors 107–174 serve as a B+ input terminal, the conductor 107 being directly connected to the connection 139 to which a B+ is applied to the anode 111, and the terminal 189 serves as the B− input terminal and is connected to the cathode 140 via the conductor 184, the probe 178, the bullet 177, the terminal 102, the connector 153 (see FIG. 3 also), the conductor 144 and the bushing 143, whereby to apply B− potential to the cathode 140. The terminal 189 also serves as an input terminal for the low voltage AC filament supply and is connected to one end of the filament 151 via the conductor 184, the probe 178, the bullet 177, the terminal 102, the connector 153, and the conductor 144, whereby to apply low voltage AC potential to the upper end of the heater 151.

The connector 158 at the lower end of the device 110 (see FIG. 3) is connected to a filter capacitor 90 of the feed through type, and more specifically is connected to the output terminal 103 that has the adjacent end thereof internally threaded and receives the threaded outer end of the terminal 158 therein, a lock washer 168 preferably being provided between the upper end of the terminal 103 and the flange 167 on the seal member 166, thereby firmly to interconnect and lock the terminal 103 and the connector 158. The terminal 103 extends downwardly beyond the lower end of the oscillator 100 and is connected to the conductor 62 from the power supply 51 that has applied thereto the low voltage AC filament supply potential. Also provided at the lower end of the device 110 is a tubular conductor 108 formed of a material that is electrically conductive, the preferred material being aluminum metal; the conductor 108 has an internal diameter substantially equal to the external diameter of the adjacent end cap wall 127 (see FIG. 3 also) and is placed in telescoping relation therewith and is electrically connected thereto, the conductor 108 also being disposed within the lower magnetic yoke 136 and extending downwardly and beyond the lower end thereof. There is provided on the lower end of the conductor 108 a cover 109 formed of conductive metal and including a flange 109a surrounding and in telescoping relationship with the lower end of the conductor 108 and mechanically and electrically secured thereto. Disposed between the terminal 103 and the cover 109 is the filter capacitor 90 that is of the same type of construction as the filter capacitor 188 described above, one of the terminals of the filter capacitor 90 being connected to the cover 109 and the other terminal of the filter capacitor 90 being connected to the terminal 103, a flange 93 being provided on the exterior of the filter capacitor 90 in overlying relationship with the cover 109. The filter capacitor 90 serves to by-pass RF energy from the terminal 103 to the outer conductor 108 through the cover 109, thereby to prevent the introduction of RF energy into the power supply 51 via the conductor 62.

During the operation of the crossed-field discharge device 110, the anode 111 and the rods 130 cooperate to provide a portion of a coaxial transmission line within the device 110, the coaxial transmission line thus formed accommodating axially extending RF waves therein. The coaxial transmission line thus formed is terminated at both ends by the end caps 125 that are connected between the anode 111 and the associated pole pieces 120 that in turn support and are electrically connected to the rods 130. Accordingly, a tuned cavity is provided which can be excited to cause oscillations therein at a frequency equal substantially to twice the length between the inner surfaces of the walls 127, whereby to provide an axially extending wave between the anode 111 and the rods 130 that is reflected by the inner surfaces of the walls 128 to produce a standing RF wave within the device 110.

In the operation of the oscillator 100, it is necessary to produce within the crossed-field discharge device 110 a predetermined pattern of electrical fields and magnetic fields. A description of the electrical fields and magnetic fields within the device 110 during the operation thereof as an oscillator and the method of creating those fields will be given. The operating potentials for the device 110 are derived from the power supply 51 described above, and more particularly, the heater supply is derived from the power supply output terminals 56 and 57, the terminal 56 being connected by the conductor 61 to the terminal 189 that is in turn connected by the conductor 184, the probe 178, the terminal 102, the connector 153 and the conductor 144 to one end of the heater 151, and the terminal 57 being connected by the conductor 62 to the terminal 103 that is in turn connected via the connector 158 and the conductor 155 to the other end of the heater 151. The DC potential from the power supply 51 is derived specifically from the output terminals 54 and 55, the conductor 60 interconnecting the output terminal 54 of the power supply 51 to the input terminal 101 (see FIG. 2 also) which is connected via the magnet coil 131, the conductor 134, the magnet coil 135, the conductor 138 and the fin 129 to the anode 111 to supply B+ potential thereto, and the conductor 61 interconnecting the output terminal 55 of the power supply 51 to the terminal 189 which is connected via the conductor 184, the probe 178, the terminal 102, the connector 153, the conductor 144 and the bushing 143 to the cathode 140 to supply B− potential thereto.

The application of the above described B+ and B− potentials to the anode 111 and the cathode 140, respectively, establishes a unidirectional electrical field 190 (see FIG. 6) that extends between the anode segments 115 and the cathode projections 147; it will be noted that each of the projections 147 provides a unidirectional electrical field in cooperation with both an adjacent anode segment 115 and an adjacent rod 130, the field between an anode segment 115 and the associated cathode projections 147 being designated by the numeral 190a and the field between a rod 130 and the associated cathode projections 147 being designated by the numeral 190b. The electrical field 190 extends substantially normal to the longitudinal axis of the anode 111, the field lines entering the surfaces 117 normal thereto, the field lines entering the surfaces of the rods 130 normal thereto and the field lines entering the cathode surfaces 148 normal thereto, whereby the field 190 takes the shape illustrated in FIG. 6.

In order to provide the necessary unidirectional magnetic field normal to or "crossed" with respect to the electrical field 190, a DC current is established in the magnet coils 131 and 135. More particularly, electrons flow from the anode 111 through the conductor 138, the magnet coil 135, the conductor 134, the magnet coil 131, and the conductor 60 to the power supply output terminal 54. When such a flow of electrons is established through the magnet coils 131 and 135, a strong unidirectional magnetic flux is established through a path including the upper flange 133, the magnetic yoke 132, the upper pole piece 120 (see FIG. 3 also), and through the interaction space 150, and then through the lower pole piece 120, the magnetic yoke 136 and the flange 137. The return path for the unidirectional magnetic field is provided through the casing 105 which is formed of a material that is magnetically permeable. Referring to FIG. 7 of the drawings, the unidirectional magnetic flux lines extending through the interaction space 150 are designated by the numeral 191, the flux line 191 extending axially through the interaction space 150 and therefore normal to the plane of the sheet of drawing in FIG. 7. Due to the provision of the pole pieces 120, and the other portions of the magnetic path having a high magnetic permeability described above, there is a uniform distribution of the unidirectional flux lines 191 throughout the recesses 116 about the rods 130 and inwardly to the outer surface of the electron emissive coating 146. It further is pointed out that the unidirectional magnetic flux lines 191 are disposed normal to the unidirectional electrical field 190 illustrated in FIG. 6, whereby the unidirectional electrical field 190 and the unidirectional magnetic field 191 provide the necessary "crossed" fields for the operation of the crossed-field discharge device 110.

As has been pointed out above, the anode 111 and the rods 130 cooperate to provide a coaxial transmission line that extends axially with respect to the device 110 and that is shorted or terminated at the opposite ends thereof by the respective end caps 125. The shorted transmission line thus provided forms a tuned cavity for the oscillator 100, the tuned cavity being readily excited at a frequency having a wave length corresponding to twice the distance between the inner surfaces of the walls 128 on the end caps 125. When the tuned resonant cavity thus formed is excited by the establishment of the unidirectional electrical field 190 of FIG. 6 and the unidirectional magnetic field 191 of FIG. 7, the tuned cavity resonates at a frequency having a wave length equivalent to twice the distance between the facing inner surfaces of the walls 128 of the end caps 125, i.e., a standing RF wave is established within the tuned cavity and extends axially thereof and axially of the device 110 and through the interaction space 150 thereof. The wavelength of the RF wave thus generated is actually substantially greater than the distance between the inner surfaces of the walls 128 because of the high capacitance between the anode 111 and the rods 130, which high capacitance is in the tuned circuit and serves to permit the generation of RF waves in the device 110 having wavelengths substantially greater than twice the distance between the inner surfaces of the walls 128.

There is believed to be associated with the standing RF wave thus established an RF electrical field disposed normal to the axis of the device 110, a diagrammatic representation of the field being illustrated in FIG. 8. From FIG. 8, it will be seen that at any moment the anode segments 115 have one RF polarity while the rods 130 have the opposite RF polarity, whereby there is a relatively strong RF electrical field between the anode 111 and the rods 130 as well as weak RF electrical fields between the anode 111 and the cathode 140 and between the rods 130 and the cathode 140. In FIG. 8, the instantaneous RF electrical field has been designated by the numeral 192, and the stronger portion thereof disposed between the anode 111 and the rods 130 has been designated 192a, the force lines being disposed normal to the surfaces associated therewith, i.e., normal to the side walls 118 and the outer wall 119 of the recesses 116 and the surfaces of the rods 130. There is a weaker portion of the RF electrical field disposed between the anode 111 and the cathode 140, that portion of the field being designated by the numeral 192b, the lines representing the portion 192b of the field being normal to the inner surfaces 117 of the anode segments 115 and normal to the outer surfaces 148 of the cathode projections 147. Finally, there is a still weaker portion of the RF electrical field between the rods 130 and the cathode 140, that portion of the field being designated by the numeral 192c, the lines representing the portion 192c of the field also being disposed normal to the associated surfaces, and specifically normal to the outer surfaces of the rods 130 and normal to the outer surface 148 of the associated cathode projections 147.

Associated with the RF electrical field 192 of the standing RF wave is an RF magnetic field 193 which is believed to have the form illustrated in FIG. 9; the RF magnetic field 193 is also disposed normal to the axis of the device 110 and is concentrated about and surrounds the rods 130 and the cathode 140. The major portion of the RF magnetic field 193 is disposed within the anode recesses 116 and is designated by the numeral 193a, but a portion of the magnetic field 193 extends about the cathode 140 and is designated by the numeral 193b.

Figure 10:
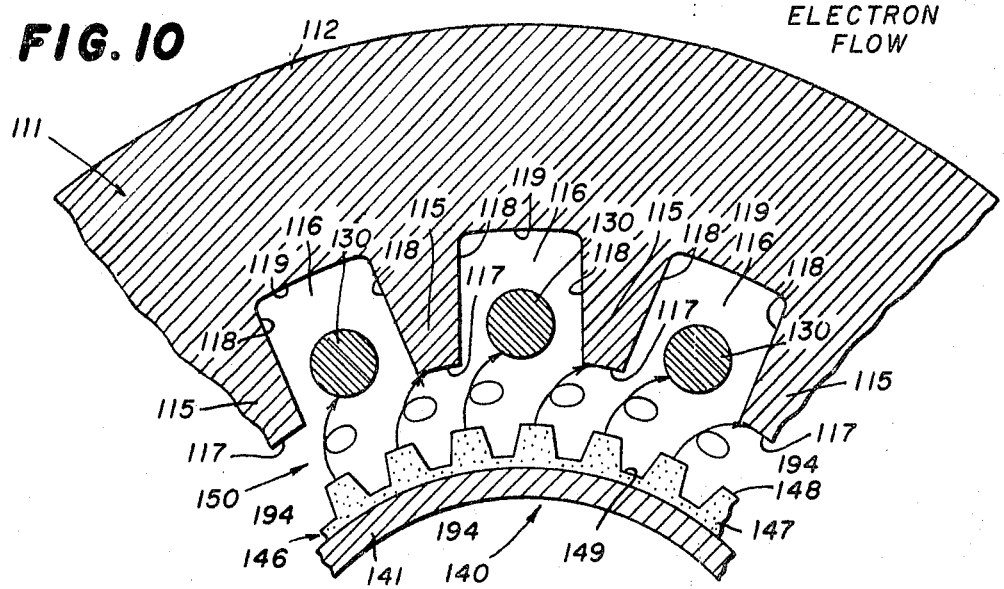

After the application of the operating potentials to the device 110, and after the cathode 140 has been heated to the operating temperature thereof by the heater 151, electrons are emitted from the emissive coating 146, the electrons being emitted into the interaction space 150 where they are subjected to the action of the unidirectional fields and the RF fields described hereinabove. There is illustrated in FIG. 10 of the drawings a diagrammatic representation of what are believed to be typical paths of electrons emitted from the cathode projections 147, the electron paths being designated by the numeral 194. As illustrated, the electrons follow a spiral path, the initial direction of flow being in a clockwise direction, this being due to the influence of the unidirectional magnetic field 191 described above. Eventually, the spiral paths 194 of the electrons carry them into contact with the anode 111 or the rods 130, whereby to complete an electrical circuit through the device 110. During the time that the electrons are in the spiral paths 194, they impart a portion of the energy content thereof to the RF standing wave within the device 110 to add power thereto and to reinforce the RF standing wave.

Figure 11:
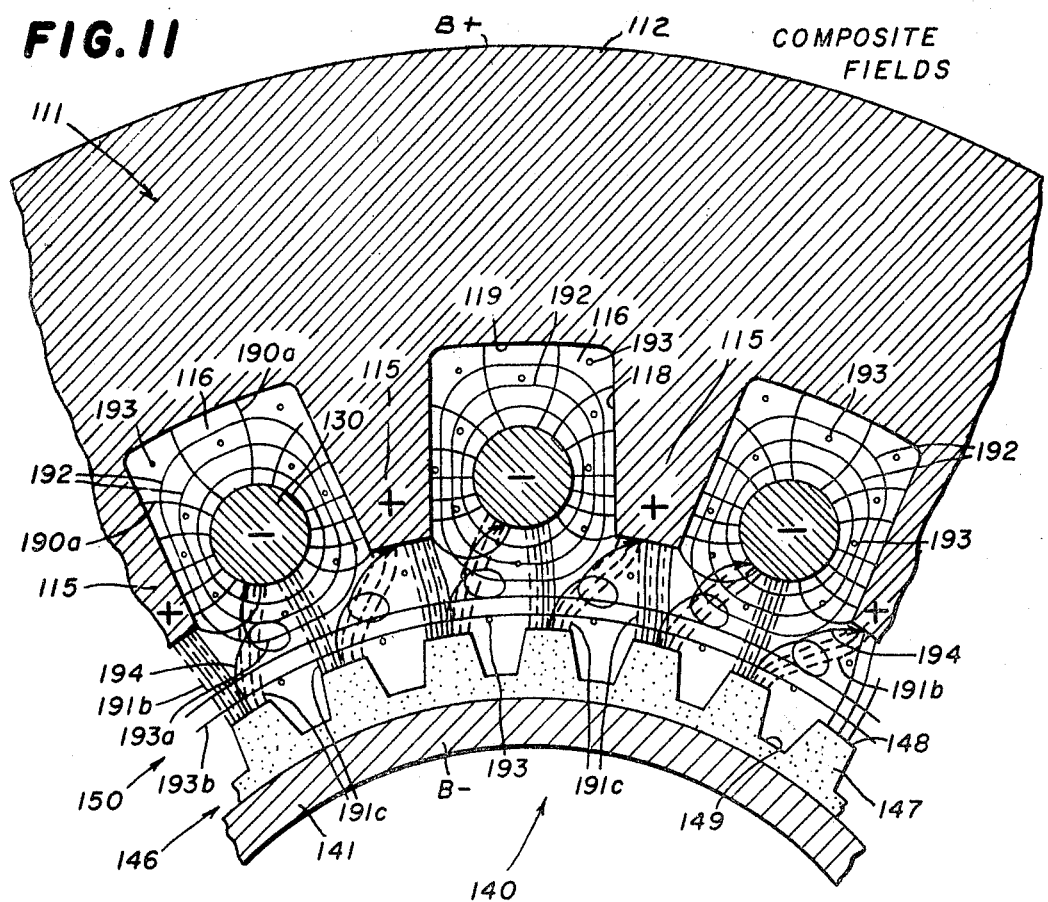

There is illustrated in FIG. 11 a composite representation of all of the fields that are believed to be present in the device 110 and in the interaction space 150 thereof when the device 110 is operating as a part of the oscillator 100. From FIG. 11 it is apparent that the electrons in the paths 194 clearly interact with the unidirectional fields and the RF fields within the interaction space 150, whereby to give up a portion of the energy of the electrons to the RF fields within the interaction space 150. In this manner the RF standing wave within the device 110 is maintained and the energy content thereof increased and replenished during the operation of the oscillator 100.

As is best seen from FIGS. 3 and 11, the cathode 140 is coupled to the RF standing wave within the interaction space 150 and therefore serves as a probe for removal of a portion of the RF energy from the tuned cavity for supplying thereof to the coupler and filter structure 170 and thence to the output transmission line 65. The output from the device 110 and the oscillator 100 appears as an RF potential between the anode 111 and the cathode 140, the anode 111 being directly connected to the end cap 125 and the lower end of the outer conductor 107, and the cathode 140 being directly connected to the terminal 102 and the probe 178. The coupler and filter structure 170 serves to connect the RF energy between the terminal 102 and the terminal 107 to the output transmission line 65, and also to apply to the cathode 140 via the probe 178 and the terminal 102 the B− operating potential and the low voltage AC filament supply from the conductor 61 connected to the power supply 51, all without applying DC operating potentials to the conductors 66 and 67 of the transmission line 65 and without the introduction of RF energy into the power supply 51 via the conductor 61.

Referring to FIG. 2, the operation of the coupler and filter structure 170 will be further described. The output terminals including the terminal 102 and the conductor 107 connected respectively to the cathode 140 and the anode 111 of the device 110 also serve as RF input terminals to the coupler and filter structure 170, thereby to connect the oscillator 100 that serves as a source of RF potential to the RF input terminals of the coupler and filter structure 170. The RF input terminals 107 and 102 are capacitively coupled respectively to a pair of output terminals for the coupler and filter structure 170 in the form of the outer conductor 171 and the inner conductor 181, respectively, whereby to insure that the DC B+ and B− potentials on the conductor 107 and the terminal 102, respectively, are not coupled to the output RF terminals 171 and 181, respectively. More specifically, the capacitive coupler 172 in the form of the insulating sleeve 173 provides a good RF coupling between the conductor 107 and the conductor 171, while preventing any DC connection therebetween. Likewise, the terminal 102 connected to the probe 178 is capacitively coupled by the coupler 182 to the output conductor 181, the insulating washer 183 serving to space the probe 178 and the telescopically arranged conductor 180 therearound.

As has been explained above, the conductors 107 and 171 are preferably telescoped and overlap a distance equivalent to ¼ of the wavelength of operation of the oscillator 100, and likewise the probe 178 and the associated conductors 180–181 are telescoped and overlap a distance equal to ¼ of the wavelength of the operating frequency of the oscillator 100. By so arranging the parts, the capacitive couplers 172 and 182 serve not only to couple the RF energy to the conductors 171 and 181, but also serve as filters for the second and higher harmonics of the operating frequency of the oscillator 100, thereby to attentuate and materially to reduce the amount of second and higher harmonics coupled to the RF output terminals provided by the coaxial conductors 171 and 181.

The DC B− potential on the conductor 61 is directly connected to the cathode 140 via the conductor 184, the probe 178, the bullet 177, the terminal 102, the connector 153 and the conductor 144 (see FIG. 3 also). The same connection also applies the low voltage AC heater supply to the upper end of the heater 151. In order to prevent the propagation of the RF energy from the oscillator 100 into the conductor 61 via the probe 178 and the conductor 184, the choke 186 has been provided, the choke 186 having a length equal to ¼ of the wavelength of the operating frequency of the oscillator 100. The choke 186 is shorted at the outer end thereof by the conductive nut 187 and in cooperation with the outer conductor 174 and the capacitive insulator 185 serves to prevent propagation of the RF energy from the oscillator 100 along the conductor 184 and into the terminal 189 and the attached conductor 61. Due to the arrangement and dimensions of —the parts, a series resonant circuit having a high impedance at the operating frequency of the oscillator 100 is provided, thereby to block the propagation of the RF energy along the conductor 184. In addition, the filter capacitor 188 of high capacitance is connected between the outer conductor 174 (which has applied thereto the B+ potential) and the terminal 189 (which has applied thereto the B− potential) and serves as a short for RF frequencies at and above the operating frequency of the oscillator 100, whereby to by-pass the RF energy and prevent introduction thereof into the power supply 51 via the conductor 61.

Recapitulating, the RF input terminals 107 and 177 for the coupler and filter structure 170 are capacitively coupled to the RF output terminals 171 and 181, respectively, thereby efficiently to transmit the RF energy generated in the oscillator 100 to the RF output terminals 171 and 181. A second harmonic and higher harmonic filter is provided between the RF input terminals 107–177 and the RF output terminals 171–181 because of the overlapping telescoping arrangement of the conductors 107–171 and the conductors 178–180, these conductors respectively overlapping a distance equal to ¼ of the wavelength of the operating frequency of the oscillator 100. The fundamental operating frequency of the oscillator 100 cannot propagate over the transmission line comprising the conductors 174 and 184 because of the presence of the high impedance choke 186 disposed therein, the choke 186 acting as a series resonant circuit at the fundamental operating frequency of the oscillator 100 and thus presents a high impedance to the propagation of energy along the transmission line 174–184. In addition, the feed through filter 188 of high capacitance that is connected between the conductors 174 and 184 (and thus between the B+ and B− input terminals to the coupler and filter structure 170) provides a low impedance path for RF energy, and particularly the second and higher harmonics of the operating frequency of the oscillator 100, so that in cooperation with the choke 186, no RF energy is fed along the conductor 184 to the DC terminal 189 and along the conductor 61 to the power supply 51. The low voltage AC heater supply is nonetheless directly connected from the conductor 61 via the terminal 189, the conductor 184, the probe 178, the bullet 177, the terminal 102, the connector 153 and the conductor 144 to the cathode 140 and the upper end of the heater 151.

Likewise, the capacitive coupler 90 of high capacitance serves to by-pass RF energy between the lower end of the heater 151 and the conductor 108 (also connected to the B+ supply), whereby to prevent propagation of RF energy from the terminal 103 via the conductor 62 to the power supply 51.

As has been explained above, the RF wave within the oscillator 100 extends axially with respect to the device 110, there being no radial RF waves within the device 110, i.e., no RF waves extending normal to the axis of the device 110. Furthermore, the radial distance between the outer surface of the cathode 140 and the outer wall 119 of the anode recesses 116 is less than that required to accommodate a radial standing wave at the operating frequency of the oscillator 100. More specifically, the radial distance between the outer surface of the cathode 140 and the outer walls 119 of the anode recesses 116 is less than that required to accommodate a radial standing wave at an operating frequency having a wavelength corresponding to twice the distance between the inner surfaces of the walls 128 on the end caps 125.

There are shown in FIGS. 12 and 13 performance charts for the crossed-field discharge device 110 described above. Referring first to FIG. 12, there is shown a standard Rieke diagram superimposed upon a Smith chart, the data being obtained utilizing a series magnetic field, i.e., the magnet coils 131 and 135 were connected in series with the anode 111 with an applied B+ potential of 430 volts. As illustrated, a family of power curves 80 was attained, the members of the family of the 80 were corresponding to 0.2, 0.4, 0.6, 0.8 and 1.0 times the maximum power having been illustrated in FIG. 12. A family of curves 81 showing the frequency of operation and the frequency pulling has also been plotted in FIG. 12, as has also the unstable region indicated by the numeral 82. The performance chart for the device 110 has been plotted in FIG. 13, the applied anode voltage being plotted along the vertical axis and the anode current being plotted along the horizontal axis. In the lower portion of FIG. 13 has been plotted a curve 83 wherein no magnetic field was provided for the device 110, whereby the values represented by the curve 83 are a measure of the emission from the cathode structure 140. The curve 84 is a plot with a series field connected to the device 110, i.e., the magnet coils 131 and 135 were connected in series with the anode 111. There further is plotted a family of curves 85 showing the anode current for an applied anode potential when a separate magnetic field is applied to the device 110, the family of curves including performance curves when the separate magnetic field current has a value of 1.0, 1.5, 2.0, 2.5 and 3.0 amperes. There also is provided a family of curves 86 in solid lines plotting lines of constant power output, eleven of the curves in the family of curves 86 being shown plotting values from 10 watts to 500 watts of output power from the device 110. Finally, a family of curves 87 in dashed lines plotting the lines of constant efficiency expressed in percent have been plotted in FIG. 12, seven of the curves in the family of curves 87 being plotted for values of efficiency from 20% to 45% efficiency.

In a constructional example of the crossed-field discharge device 110, the various parts thereof have the following dimensions. The anode 111 has an external diameter of 1⅜ inches, an overall length of 2⅛ inches, a distance from the longitudinal axis to the surfaces 117 of ⅜ inch, a distance from the longitudinal axis to the surfaces 119 of ½ inch, a radial dimension of the recesses 116 of ⅛ inch, a circumferential dimension of the recesses 116 of ⅛ inch, and a circumferential dimension of the surfaces 117 of 3/32 inch. The rods 130 have a diameter of 1/16 inch and a length between adjacent surfaces of the pole pieces 120 of 1 9/16 inches, and the inner surface 130a thereof are spaced outwardly with respect to the adjacent surfaces 117 a distance of 0.005 inch. The cathode 140 has an overall diameter of 21/32 inch and a length of the emissive coating 146 of 1⅛ inches; the projections 147 have a radial extent of 1/32 inch, the surfaces 148 have a circumferential extent of 1/32 inch, and the spaces 149 have a circumferential extent of 1/32 inch. The spacing between the anode surfaces 117 and the cathode surfaces 148 is 1/16 inch; the angular displacement between the center line of a cathode projection 147 and the center line of the adjacent anode segment 115 or rod 130 is 3°. The pole pieces 120 each have a longitudinal extent of 7/16 inch, the diameter of the surfaces 121 is ⅝ inch, the maximum dimension across the projections 122 is 1 inch. A longitudinal extent of each of the end caps 125 is ⅜ inch, distance between the inner surfaces of the end walls 128 is 2½ inches and the outer diameter of the wall 127 is 1 3/16 inch. The longitudinal extent of each of the insulating sleeves 164 is ¾ inch and the external diameter thereof is ½ inch.

Referring to FIG. 14 of the drawings, there is diagrammatically illustrated the manner in which the output from the oscillator circuit 50 can be connected to the input of an amplifying circuit 200 which embodies therein certain additional features of the present invention. Inasmuch as the construction and operation of the power supply 51 and the oscillator 100 in the circuit of FIG. 14 are identical to those described above, like reference numerals have been applied to like parts throughout and the description thereof will not here be repeated. It will be understood that the output of the oscillator 100 is applied to a coaxial transmission line 210 which has the outer conductor 211 thereof connected to the capacitive coupler 172, and the outer conductor 211 is in turn connected by capacitive couplers 225 to a cavity connected to one end of a crossed-field discharge device 110 of the type set forth above. The transmission line 210 also comprises an inner conductor 212 which terminates in a radiating probe 213 that radiates into a cavity formed by a coaxial transmission line 220 connected to the input to the lower end of the device 110 (see FIG. 15 also). The amplifying circuit 200 also includes a pair of input terminals 201 and 202 that are connected respectively to the DC output terminals 54 and 55 of the power supply 51 by means of the conductors 60 and 61, respectively; the input terminal 202 is also connected by the conductor 61 to the low voltage AC output terminal 56 of the power supply 51. A third input terminal 203 is provided for the amplifying circuit 200, the input terminal 203 being connected by the conductor 62 to the low voltage AC output terminal 57 of the power supply 51.

The output of the amplifying circuit 200 is applied to a cavity including an outer conductor 247 that is capacitively coupled by the coupler 245 to an output transmission line 240 which connects with the transmission line 65. More specifically, the outer conductor of the transmission line 240 is directly connected to the outer conductor 66 of the transmission line 65 and a coupling probe 252 is provided within the transmission line 240 and is connected to the inner conductor 67 of the output transmission line 65. The capacitive coupling provided by the coupler 245 is desirable and necessary since the output terminal 247 is at a relatively high DC potential, whereby it is necessary electrically to isolate the output terminal 247 from the outer conductor 66 so that the outer conductor 66 can be grounded. As has been pointed out above, it is inherent in the construction and operation of the power supply 51, which is of the voltage doubler and rectifier type, that neither the conductor 60 nor the conductor 61 can be grounded, whereby it is also not possible to ground the output terminal 247 of the amplifying circuit 200. Accordingly, it is also necessary and desirable that the amplifying circuit 200 be electrically shielded by a grounded outer housing (not shown) disposed therearound in order to prevent a user of the amplifying circuit 200 from being placed in contact with relatively high DC voltages if the user should accidentally come in contact with the amplifying circuit 200.

The microwave energy supplied from the amplifying circuit 200 to the transmission line 65 can be used for any desired purpose, two typical uses of the microwave energy being illustrated in FIG. 14, the first use being illustrated in the upper right-hand portion of FIG. 14, and the second use being illustrated in the lower right-hand portion of FIG. 14. Referring to the first use illustrated in the upper right-hand portion of FIG. 14, the transmission line 65 is shown coupled to an antenna of the type commonly used in search radar, the outer conductor 66 being connected to outer radiating or antenna elements 68, and the inner conductor 67 being connected to an inner radiating or antenna element 69, the antenna elements 68 and 69 serving to match the impedance of the transmission line 65 to the impedance of the atmosphere. Referring to the second use of the microwave energy illustrated in the lower right-hand portion of FIG. 14, the transmission line 65 is shown coupled to an electronic heating apparatus, such as the electronic range 70 illustrated that is especially designed for home use. The electronic range 70 in FIG. 14 is identical to the electronic range 70 described above with respect to FIG. 1 of the drawings, and accordingly, like reference numerals have been applied to like parts throughout. The microwave energy within the transmission line 65 is radiated into the internal cavity of the electronic range 70 to provide the power for heating materials disposed therein. It further will be understood that in a preferred embodiment of the range 70, the power supply 51, the oscillator 100, and the amplifying circuit 200 together with the transmission line 65 are all preferably disposed within a common housing that also includes the casing 71, the common housing preferably being formed of metal and grounded for safety purposes.

Further details of the construction of the amplifying circuit 200 and the connections thereof to the crossed-field discharge device 110 incorporated therein will now be described with reference to FIG. 15 of the drawings. The construction of the crossed-field discharge device 110 incorporated in the amplifying circuit 200 of FIG. 15 is identical to the construction of the crossed-field discharge device 110 described above with reference to the oscillator 100 and illustrated in detail in FIGS. 3 to 5 of the drawings, whereby like reference numerals have been applied to like parts throughout including the magnet coils 131 and 135, the magnetic yokes 132 and 136 and the associated mechanical and electrical connections. As illustrated, the input coaxial transmission line 210 includes an annular outer conductor 211 within which is disposed an inner conductor 212, the left-hand end of the outer conductor 211 communicating with an outer coaxial transmission line 220 that is connected to the lower end of the device 110. More specifically, the coaxial transmission line 220 includes an outer annular conductor 221 within which is disposed an annular inner conductor 222, the lower and outer ends thereof being interconnected and the space therebetween closed by an end wall 223. An opening is formed adjacent to the lower end of the outer conductor 221 and the outer conductor 211 is mechanically and electrically connected thereto in surrounding relationship with the opening therein. Connected between the input transmission line conductors 211 and 212 is the radiating probe 213 that serves to radiate the microwave energy within the input transmission line 210 into the coaxial transmission line 220. The outer conductor 221 extends upwardly toward the lower end of the anode 111 and is capacitively coupled thereto by a coupler 225; more particularly, the outer annular conductor 227 is mechanically and electrically connected to the anode 111 and extends downwardly to the lower end of the magnetic yoke 136 and surrounds the adjacent portion of the outer conductor 221, an insulating dielectric sleeve 226 being disposed between and substantially filling the annular space between the concentric conductors 221 and 227, the sleeve 226 being formed of a synthetic organic plastic resin, the preferred resin being a tetrafluoroethylene resin sold under the trademark "Teflon." The inner conductor 222 extends upwardly toward the lower end of the cathode 140 and is capacitively coupled thereto by a coupler 230; more particularly, an outer terminal 203 is threadedly connected at the upper end thereof to the connector 158 that is in turn connected to the cathode 140 via the heater 151 and is capacitively coupled to the cathode 140 at the lower end thereof, the terminal 203 extending downwardly beyond the end wall 223 and being disposed within and surrounded by the inner conductor 222, an insulating and dielectric sleeve 231 being disposed between and substantially filling the annular space between the terminal 203 and the conductor 221, the sleeve 231 being formed of a synthetic organic plastic resin, the preferred resin being a tetrafluoroethylene resin sold under the trademark "Teflon."

The output from the amplifying circuit 200 is taken from the upper end of the crossed-field discharge device 110, the output being taken from a coaxial transmission line 240 connected to the upper end of the device 110. More specifically, the coaxial transmission line 240 includes an outer annular conductor 241 within which is disposed an annular inner conductor 242, the upper and outer ends thereof being interconnected and the space therebetween closed by an end wall 243. An opening is formed adjacent to the upper end of the outer conductor 241 and the outer conductor 66 of the output transmission line 65 is mechanically and electrically connected thereto in surrounding relationship with the opening therein. Connected between the output transmission line conductors 66 and 67 is a probe 252 that serves to pick up the microwave energy within the output transmission line 240 and to apply the microwave energy to the output transmission line 65. The outer conductor 241 extends downwardly toward the upper end of the anode 111 and is capacitively coupled thereto by a coupler 245; more particularly, an outer annular conductor 247 is mechanically and electrically connected to the anode 111 and extends upwardly to the upper end of the magnetic yoke 132 and surrounds the adjacent portion of the outer conductor 241, an insulating dielectric sleeve 246 being disposed between and substantially filling the annular space between the concentric conductors 241 and 247, the sleeve 246 being formed of a synthetic organic plastic resin, the preferred resin being a tetrafluoroethylene resin sold under the trademark "Teflon." The inner conductor 242 extends downwardly toward the upper end of the cathode 140 and is capacitively coupled thereto by a coupler 250; more particularly, an output terminal 202 is provided having the lower end thereof threadedly attached to the connector 153 that is in direct electrical connection with the upper end of the cathode 140 and extends upwardly therefrom and outwardly beyond the end wall 243, the inner annular conductor 242 surrounding the adjacent portion of the terminal 202, an insulating dielectric sleeve 251 being disposed between and substantially filling the annular space between the terminal 202 and the conductor 242, the sleeve 251 being formed of a synthetic organic plastic resin, the preferred resin being a tetrafluoroethylene resin sold under the trademark "Teflon."

The conductor 60 that is connected to the B+ output terminal 54 of the power supply 51 is connected as at 201 to one terminal of the magnet coil 131, whereby to apply the B+ potential to the anode 111 of the device 110 through the magnet coil 131, the conductor 134, the magnet coil 135, the conductor 138 and the connection 139 to one of the cooling fins 129 that is electrically connected to the anode 111. The conductor 61 that is connected both to the B− output terminal 55 of the power supply 51 and one of the terminals 56 carrying the low voltage AC output for the heater 151 is attached to the terminal 202 that is in turn directly connected to the cathode 140 through the connector 153, the conductor 144 and the bushing 143. Finally, the other terminal 57 of the power supply 51 carrying the low voltage AC output for the heater 151 is connected by the conductor 62 to the terminal 203 that is in turn connected to the other end of the heater 151.

The microwave energy to be amplified in the amplifying circuit 200 is applied thereto through the input transmission line 210, and more particularly, the probe 213 radiates into the coaxial transmission line 220 that is capacitively coupled both to the anode 111 and the cathode 140, thereby to apply the input energy between the anode 111 and the cathode 140. In order to provide a suitable match between the impedance of the transmission line 210 and the impedance of the amplifying circuit 200, the transmission line 220 preferably has a length equivalent to ¾ of the wavelength of the energy to be amplified, i.e., the distance between the inner surface of the outer wall 223 and a plane normal to the axis of the device 110 and disposed midway between the ends of the anode 111 is equivalent to ¾ of the wavelength of the microwave energy to be amplified. It would also be permissible to connect the transmission line 210 to the transmission line 220 at a point spaced ¼ of the wavelength of the microwave energy to be amplified from the midplane of the device 110, but for most frequencies to be amplified it is not possible to make the necessary electrical connections at this point as illustrated in FIG. 15.

In order to provide a suitable match between the impedance of the amplifying circuit 200 and the impedance of the output transmission line 65, the transmission line 240 preferably has a length equivalent to ¾ of the wavelength of the microwave energy to be amplified, i.e. the distance between the inner surface of the end wall 243 and a plane normal to the axis of the device 110 and disposed midway between the ends of the anode 111 is equivalent to ¾ of the wavelength of the microwave energy to be amplified. It would also be permissible to connect the transmission line 65 at a point spaced ¼ of the wavelength of the microwave energy being amplified from the midplane of the device 110, but for most frequencies it is not possible to make the necessary electrical connections at this point as illustrated in FIG. 15.

The microwave energy thus injected into the lower end of the amplifying circuit 200 passes into the crossed-field discharge device 110 and specifically along the coaxial transmission line provided by the cooperation between the cathode 140 forming one conductor and the interconnected anode 111 and rods 130 forming the other conductor therein. As the microwave energy passes through the device 110, the RF fields associated therewith are reinforced and augmented by interaction with the electrons that pass from the cathode 140 to the anode 111 and the rods 130. It is believed that the amplifying circuit 200 operates in accordance with the M-type fast wave interaction principle, whereby the input microwave energy in passing through the interaction space 150 interacts with the fields disposed therein, and the power content of the microwave energy is augmented and amplified so that a microwave energy output is obtained between the anode 111 and the cathode 140 at the other end of the device 110 that has the same frequency as the microwave energy supplied through the input transmission line 210, but has a power content substantially greater than the power content of the microwave energy supplied via the transmission line 210, the power amplification being for example in the range from about 6 to 10. It has been found that the single interaction space 150 achieves this substantial amplification although the length thereof is on the order of about only 0.1 times the wavelength of the energy being amplified, whereas prior devices have required lengths of the interaction space that are many times the wavelength of the microwave energy being amplified, for example as many as twenty times the length of the wavelength of the microwave energy being amplified.

The output microwave energy appears between the conductors 241 and 242, the conductor 241 being capacitively coupled by the coupler 245 to the anode 111 and the conductor 242 being capacitively coupled by the coupler 250 to the cathode 140. The microwave energy in the transmission line 240 formed by the concentric conductors 241 and 242 is coupled by the probe 252 to the output transmission line 65, and specifically between the outer conductor 66 and the inner conductor 67 thereof.

It is pointed out that there is no cutoff frequency for the amplifying circuit 200 since the device 110 essentially comprises an open ended transmission line formed by the cooperation of the cathode 140 serving as one conductor and the anode 111 and the interconnected rods 130 serving as the other conductor, whereby a wide spectrum of microwave energy can be amplified utilizing the amplifying circuit 200. The power gain, however, is a function of the bandwidth of the system which is determined by the Q of the cavity that is formed by the cooperation of the input transmission line 220 and the device 110; a large bandwidth requiring a lower Q results in a lower power gain, and conversely, a small bandwidth requiring a higher Q results in a higher power gain. The power gain is also a function of the length of the interaction space 150 in the device 110, a greater length of the interaction space 150 providing a greater power gain, and conversely, a smaller length of the interaction space 150 providing a smaller power gain.

To further illustrate the characteristics of the amplifying circuit 200, there are illustrated in FIG. 15 test connections to the input transmission line 210 and the output transmission line 65 by means of which other characteristics of the amplifying circuit 200 may be illustrated. The oscillator 100 as illustrated in FIG. 15 has the output thereof connected by a transmission line 270 to the input of an attenuator 272, a wave meter 271 also being connected to the transmission line 270 so that the frequency of the microwave energy supplied to the transmission line 270 can be monitored. The output from the attenuator 272 is applied by a transmission line 273 to the input of a tuner 274 which in turn has the output thereof connected to the input transmission line 210. The output transmission line 65 is connected to the input of an output tuner 275 that in turn is connected by a transmission line 276 to a load 278 by which the power provided from the amplifying circuit 200 can be measured; also connected to the transmission line 276 is a wave meter 277 by which the frequency of the microwave energy within the transmission line 276 can be monitored.

In a first test of the amplifying circuit 200, the operating potentials were removed therefrom, i.e., the operating potentials applied via the conductors 60, 61 and 62 were removed; the input and output tuners 274 and 275, respectively, were adjusted to give maximum power transfer from the oscillator 100 into the load 278. When the operating potentials were then applied to the amplifying circuit 200 via the conductors 60, 61 and 62, the amount of microwave energy delivered to the load 278 was found to increase in proportion to the input power. The efficiency of amplification obtained was of the same order as that found when the device 110 was operated as a power oscillator as described above with reference to FIG. 2.

The frequency of the output energy delivered to the load 278 was then measured by means of the wave meter 277, and it was found that a single frequency of microwave energy was present in the transmission line 276, that frequency being the frequency of operation of the oscillator 100 as determined by the wave meter 271. The frequency of operation of the oscillator 100 was then varied to determine whether the frequency of the output was due to the tuning of the circuits in the amplifying circuit 200, and it was found that the output frequency of the amplified microwave energy as measured by the wave meter 277 varied directly in accordance with the variations in the frequency of operation of the oscillator 100 as determined by the wave meter 271, whereby it was concluded that there was no electronic tuning effect in the amplifying circuit 200. Further to verify that there was no operation of the amplifying circuit 200 as an oscillator, the operating potentials were removed from the oscillator 100 so that no output was obtained therefrom as measured by the wave meter 271. The output from the amplifying circuit 200 immediately dropped to zero indicating that there were no oscillations in the amplifying circuit 200, whereby to verify that the operation of the circuit 200 was truly as an amplifier and not as an oscillator.

Finally, the microwave energy to the amplifying circuit 200 was varied by means of the attenuator 272 over the range from 1 watt to 100 watts. It was determined that there was stable operation of the amplifying circuit 200 over the entire range of power input, the output from the amplifier 200 as measured by the load 278 being directly proportional to the power supplied as an input to the amplifying circuit 200 via the input transmission line 210.

There further are illustrated in FIG. 15 additional connections to the amplifying circuit 200 to accommodate the application of modulating signals thereto. More specifically, there is provided a resistor 280 having one terminal thereof connected by a conductor 281 to the tubular conductor 227 that is connected to the anode 111 of the device 110, the conductor 281 also being connected to a terminal 282; and the other terminal of the resistor 280 is connected by the conductor 62 to the terminal 203 that is directly connected to the cathode 140, the conductor 62 also being connected to a terminal 283. Accordingly, it will be seen that the input terminal 282 is directly connected to the anode 111 and the input terminal 283 is connected to the cathode 140 of the device 110. A modulating signal can be applied between the input terminals 282 and 283, whereby to modulate the amplitude of the microwave energy supplied by the output of the amplifying circuit 200 to the output transmission line 65.

There is illustrated in FIG. 16 of the drawings a crossed-field discharge device 310 that is a modification of the crossed-field discharge device 110, the device 310 differing from the device 110 fundamentally in the construction and arrangement of the cathode 340 thereof, whereby all of the other parts of the device 310 have the same construction and arrangement as do the corresponding parts in the device 110; therefore like reference numerals in the 300 series have been applied to the parts in the device 310 that are identical in construction and arrangement to parts in the device 110. The cathode 340 in the device 310 includes a cathode wall 341 conical in shape, the larger end of the conical wall 341 being disposed upwardly and the smaller end of the conical wall 341 being disposed downwardly. More specifically, the conical wall 341 is a section of a right cone and has the longitudinal axis thereof in alignment with the longitudinal axis of the anode 311 and the longitudinal axis of the device 310.

A first end wall 342 is provided at the upper end of the cathode wall 341 and has a diameter slightly less than the internal diameter of the upper end of the wall 341 and is provided with an upwardly extending flange 342a, the flange 342a fitting within the associated end of the cathode wall 341 and being suitably connected thereto as by welding. An outwardly extending flange 342b is formed on the upper edge of the flange 342a, and the flange 342b in turn carries an upwardly extending flange 342c which surrounds and embraces the adjacent insulator 345 to assist in the centering of the cathode structure 340. Formed centrally in the end wall 342 is an opening that receives therethrough the bushing 343, the end wall 342 being secured to the bushing 343 and also serving to assist in centering the cathode structure 340 with respect to the device 310.

A second end wall 382 is disposed at the lower end of the cathode wall 341 and carries an upwardly extending flange 382a, the flange 382a fitting within the associated end of the cathode wall 341 and being suitably connected thereto as by welding. The upper edge of the flange 382a carries an inwardly directed flange 382b and cooperates with the associated bushing 342 and is mechanically and electrically connected thereto. The outer edge end wall 382 carries a downwardly directed flange 382c which surrounds and embraces the adjacent end of the adjacent insulator 345 to center the lower end of the cathode structure 340 with respect to the device 310. The upper bushing 343 has a centrally disposed opening therein which receives the lower end of the conductor 344, the lower end of the conductor 344 being mechanically and electrically secured to the bushing 343. The lower bushing 343 has an opening centrally thereof and receives therethrough the insulated 357 which in turn has an opening therethrough receiving and supporting the conductor 355 extending downwardly through the associated bushing 345 and the associated insulating sleeve 364.

The cathode wall 341 is provided with the sintered porous coating 346 impregnated with a suitable electron emissive oxide material, whereby upon heating of the cathode structure 340, the coating 346 readily emits electrons from the outer surface thereof. Preferably the coating 346 is provided with a plurality of outwardly extending projections (not shown) like the projections 147 described above, the projections on the coating 346 being oriented with respect to the anode segments 315 and the rods 330 in a manner like that described above when designating the relationship between the projections 147 and the anode segments 115 and the rods 130.

As illustrated, the cathode structure 340 is of the indirectly heated type, and accordingly, there has been provided within the conical cathode wall 341 a heater 351 in the form of a coiled filament extending substantially the entire length of the cathode wall 341 and spaced inwardly a short distance from the inner surface thereof; more particularly, the individual coils of the heater 351 are of decreasing diameter from the top to the bottom thereof with the outer surfaces of the heater 351 lying on a cone that is slightly smaller than the cathode wall 341. The upper end of the heater 351 has an outer end 352 that extends upwardly and into the lower end of the conductor 344 for mechanical and electrical connection thereto, the lower end of the heater 351 has an outer end of the conductor 355 for mechanical and electrical connection thereto.

The device 310 can be used both in the oscillator 100 described above and the amplifying circuit 200 described above. When connected as an oscillator, the output transmission line 65 in FIG. 2 is connected to the upper end of the device 310, i.e., to the end of the device 310 wherein the cathode 340 is spaced the minimum distance away from the anode 311. It has been found that the energy output of the oscillator is materially increased by utilizing the device 310 therein. When utilizing the device 310 in the amplifying circuit 200 in FIG. 15, the input transmission line 210 and associated structure is connected to the lower end of the device 310 as illustrated in FIG. 16, i.e., to the end of the device 310 at which the cathode 340 is spaced the greatest distance away from the anode 311 and wherein the cathode 340 has the smallest diameter; and the output transmission line 65 and associated structure is connected to the upper end of the device 310 as illustrated in FIG. 16, i.e., to the end of the device 310 wherein the cathode 340 is spaced the minimum distance from the anode 311, and wherein the cathode 340 has the largest diameter thereof. Utilization of the device 310 in the amplifying circuit 200 results in an improved power gain therethrough as compared to an amplifying circuit 200 incorporating the device 110 therein.

There is illustrated in FIGS. 17 to 21 of the drawings a further modified form of a crossed-field discharge device made in accordance with and embodying the principles of the present invention, the crossed-field discharge device being shown incorporated in an oscillator designated by the numeral 400, and the crossed-field discharge device being designated by the numeral 410. Referring specifically to FIGS. 18 to 21, it will be seen that the crossed-field discharge device 410 includes an anode 411, a pair of pole pieces 420 and 420A, a plurality of rods 430, a cathode structure 440, an interaction space 450 and end structures 460 and 470. The anode 411 is formed of a metal having good electrical conducting properties and good heat transmission properties, the preferred material of construction for the anode 411 being copper. The anode 411 is essentially cylindrical in shape and has an axially extending opening therein, the opening being larger adjacent to the outer ends thereof to provide inner end walls 413 and 414 and being even larger in diameter immediately adjacent to the outer ends to provide outer end walls 413a and 414a. The inner surface of that portion of the anode 411 disposed between the inner end walls 413 and 414 has a plurality of axially extending anode segments 415 thereon that project radially inwardly into the axially extending space within the anode 411 and providing therebetween a corresponding plurality of axially extending anode recesses 416, fifteen of the anode segments 415 and fifteen of the corresponding recesses 416 being provided in the anode 411 as illustrated. Each of the anode segments 415 has an axially extending inner surface 417 and a pair of outwardly directed side walls 418 which are joined with the side walls of adjacent anode segments 418 by an outer wall 419, the walls 418 and 419 also defining the associated recesses 416. The circumferential extent of the inner surfaces 417 is substantially less than the radial depth of the recesses 416 and is also substantially less than the circumferential distance between adjacent inner surfaces 417.

In order to remove heat from the anode 411 during the operation of the device 410, there is disposed on the outer wall 412 thereof a plurality of outwardly and radially extending cooling fins 429, eight of the fins 429 being illustrated in FIG. 17 in a stacked array wherein the fins are spaced substantially equidistantly one from the other. The fins 429 are formed of a good heat conducting material such as copper and are both in mechanical connection and heat transfer connection with the outer wall 412, the fins 429 preferably being brazed upon the outer surface of the wal 412. The shape of the fins 429 is such that they fit within a casing 405 provided for the device 410, there preferably being provided means for passing a cooling fluid, such as a stream of air, through the casing 405 and over the fins 429 to effect cooling thereof and a consequent removal of heat from the anode 411 and the other parts of the device 410 during the operation thereof. There also is provided in the upper portion of the anode 411 an opening that receives therein the adjacent end of a tube 427 which is used to evacuate the space defined within the device 410, all as is well understood in the art.

Mounted on the upper end of the anode 411 is the pole piece 420, the pole piece 420 including generally cylindrical lower portion 421 that carries on the upper end thereof an outwardly directed flange 422 that is seated upon the outer end wall 413a of the anode 411 and is mechanically and hermetically secured thereto. The pole piece 420 is formed of a material having a high magnetic permeability and is utilized to shape and concentrate the unidirectional magnetic field within the interaction space 450. The other pole piece 420A is disposed at the lower end of the anode 411 and includes a generally cylindrical portion 421A extending into the axially extending opening in the anode 411 and having at the lower end thereof an upwardly extending flange 422A that is received in the lower end of the anode 411 and is seated against the outer end wall 414a, a mechanical connection and hermetic seal being provided between the anode 411 and the pole piece 420A. It will be understood that the pole piece 420A is also formed of a material such as iron having high magnetic permeability and also serves to direct and shape the unidirectional magnetic field through the interaction space 450.

A pair of spaced apart plates 425 and 426 is provided within the anode 411, the plate 425 being spaced above the inner end wall 413, and the other plate 426 being disposed below the inner end wall 414 and within an opening 423A in the pole piece 420A and secured thereto. The plates 425 and 426 have aligned openings therein that receive therethrough the associated ends of the rods 430, the rods 430 being mechanically and electrically connected both to the plate 425 and to the plate 426, and thus also being mechanically and electrically connected to the pole piece 420A. The number of rods 430 corresponds to the number of recesses 416, whereby there are fifteen of the rods 430 provided, each of the rods 430 being disposed essentially centrally with respect to the associated recess 416 (see FIG. 20 also), but having the inner edges 430a thereof disposed slightly upwardly with respect to the inner surface 417 on the adjacent anode segments 415. As illustrated, the rods 430 are cylindrical in shape and circular in cross section, the diameter of each of the rods 430 being approximately equal to ½ of the dimensions of an associated recess 416.

In order to establish a unidirectional magnetic field extending axially through the interaction space 450 within the anode 411, there has been provided a pair of magnet coils 431 and 435 (see FIG. 17), the magnet coil 431 being disposed about the upper portion of the device 410 and the other magnet coil 435 being disposed about the lower portion of the device 410. The coils 431 and 435 are each shaped as a torous, are wound of electrically conductive wire, and as illustrated, are disposed respectively about magnetic yokes 432 and 436 in the form of cylinders that are disposed within the opening in the associated coils, the magnetic yokes 432 and 436 having inner openings therein having diameters equal substantially to or slightly greater than the external diameter of the anode 411, the ends of the anode 411 being telescopically received in the associated magnetic yoke 432 and 436. These further are provided outwardly extended flanges 433 and 437, respectively, on the magnetic yokes 432 and 436, and interconnecting the magnetic yokes 432 and 436 is the casing 405. It will be understood that the pole piece 420, the pole piece 420A, the magnetic yokes 432 and 436, the flanges 433 and 437 and the casing 405 are all formed of metals that have a high magnetic permeability, whereby when the magnet coils 431 and 435 are energized, a strong and uniform unidirectional magnetic field is established between the pole piece 420 and 420A within the device 410 and extending axially therethrough.

The circuit for energizing the coils 431 and 435 can be traced from the conductor 60 of the power supply 51 to an input terminal 401 to which is connected one terminal of magnet coil 431, the other terminal of magnetic coil 431 being connected by a conductor 434 to one terminal of the magnet coil 435, and the other terminal of the magnet coil 435 being connected by a conductor 438 to one of the cooling fins 429 by means of a connection 439, the cooling fin 429 being in direct connection with the anode 411. The flow of current through the magnet coils 431 and 435 serves to produce a unidirectional magnetic field within the crossed-field discharge device 410.

The cathode structure 440 is provided in the axially extending space defined by the anode 411, the cathode structure 440 including a cylindrical wall 441 arranged with the axis thereof disposed at the axis of the anode 411. A first end wall 442 is provided at the upper end of the wall 441 and completely closes the associated end of the wall 441 and is provided with a downwardly extending flange 442a, the flange 442a fitting about the adjacent end of the wall 441 and being suitably connected thereto as by welding. A second end wall 442 is disposed at the lower end of the wall 441 and completely closes the same and is provided with an upwardly extending flange 442a, the flange 442a fitting about the lower end of the wall 441 and being suitably secured thereto as by welding. The wall 441 and the end walls 442 are all formed of a heat resistant and electrically conductive material, the preferred material of construction being nickel.

The outer surface of the cylindrical wall 441 is provided with a sintered porous coating 446 impregnated with a suitable electron emissive oxide material, whereby upon heating of the cathode structure 440, the coating 446 readily emits electrons from the outer surface thereof. Referring particularly to FIG. 20 it will be seen that the coating 446 is shaped to provide a plurality of outwardly extending projections 447 each having outwardly converging side walls joining an essentially circumferentially arranged outer surface 448, a space 449 being provided between adjacent cathode projections 447. As illustrated, the circumferential extent of each outer surface 448 is substantially equal to the spacing 449 between adjacent projections 447. The preferred range of the circumferential extent of the outer surface 448 is approximately 25% to 60% of the circumferential distance between the centers of adjacent outer surfaces 448. The radial dimension of each of the projections 447 is also preferably greater than about 20% of the spacing between the anode 411 and the coating 446 on the cathode structure 440. The number of projections 447 provided on the coating 446 is equal to the number of anode segments 415, whereby there are fifteen of the projections 447 provided upon the coating 446. The outer surfaces of the coating 446 together with the inner surfaces of the anode 411 define the interaction space 450 disposed therebetween in which the emitted electrons from the coating 446 interact with the electrical fields and the magnetic fields disposed between the anode 411 and the cathode structure 440. The projections 447 combine with the anode segments 415 and the rods 430 to provide a preferred distribution of the several fields within the interaction space 450 of the device 410 that results in more desirable operating characteristics of the device 410. One particularly desirable result of the shape of the coating 446 as described is to minimize back heating of the cathode 440, the desirable emitted electrons emanating from the projection 447, and the undesirable electrons emanating from the spaces 449 between the projections 447, thereby to facilitate the emission of desirable electrons and to suppress the emission of undesirable electrons.

In addition, the center line of each projection 447 is circumferentially displaced relative to the center line of its corresponding anode segment 415; more specifically, the center of the projections 447 are displaced in a clockwise direction a circumferential distance equal to approximately 40% of the circumferential space between the center lines of adjacent anode segments 415. The circumferential displacement of the projections 447 with respect to the corresponding anode segments 415 is preferably in the range between 0% and approximately 45% of the circumferential spacing between adjacent anode segments 415, a preferred range being between 25% and approximately 45% of the spacing between adjacent anode segments 415, a still more preferred range being between approximately 35% and 45% of the spacing between adjacent anode segments 415, and on the downstream side, i.e., in the direction of normal initial electron flow from the projections 447. Finally, it will be seen that the electron emissive coating 446 is confined within the inner end walls 413 and 414 of the anode 411, the cathode structure 440 being carefully centered with respect to the anode 411 and the rods 430.

As illustrated, the cathode structure 440 is of the indirectly heated type, and accordingly, there has been provided within the cathode wall 441 a heater 451 in the form of a coiled filament extending substantially the entire length of the wall 441 and spaced inwardly a short distance from the inner surface thereof. The upper end of the heater 451 has an outer end 452 that extends downwardly through the center of the heater 451 and through an opening 442b in the lower end wall 442 and is spaced therefrom to be insulated electrically with respect thereto. The lower end of the heater 451 has an outer end 454 that extends downwardly through an opening in the lower end wall 442 and is mechanically and electrically secured thereto to provide an electrical connection for the cathode 440, the end 454 also extending downwardly into an opening in the upper end of a conductor 455 for mechanical and electrical connection therewith, whereby the conductor 455 is in electrical connection both with the cathode 440 and one end of the heater 451. Disposed below the lower end wall 442 is an insulating block 443 formed of ceramic and extending downwardly into an opening 423A in the center of the pole piece 420A, the insulator 443 preferably being formed of ceramic and having openings therethrough receiving the heater end 452 and the conductor 455 therethrough. The lower end of the insulator 443 rests upon an output terminal 456, and specifically upon an outturned flange 456a at the upper end thereof and to which is mechanically and electrically connected the lower end of the heater end 452. Provided at the lower end of the connector 456 is a second outwardly directed flange 456b disposed well below the lower end of the anode 411. Finally, the lower end of the conductor 455 is mechanically and electrically connected to an output terminal 458.

A first end structure 460 closes and hermetically seals the upper end of the device 410 and specifically provides a seal between the pole piece 420 and an output conductor 444 extending through an opening 423 disposed centrally thereof. More specifically, an RF output is provided by a plate 445 that is spaced a short distance from the rod plate 425 so as to be capacitively coupled thereto for RF microwave energy, the plate 445 being circular in shape and being disposed with the center thereof at the longitudinal axis of the device 410. Connected to the center of the plate 445 is a conductor 444 extending upwardly therefrom and through the opening 423 in the pole 420, the conductor 444 extending outwardly beyond the upper end of the pole piece 420 and having a conductor 444a integral therewith that passes through and is mechanically and electrically connected to an output connector 453. The end structure 460 includes a first seal member 461 that is essentially cylindrical in shape and has the axis thereof in alignment with the axis of the anode 411, the seal member 441 being preferably formed of "Fernico" alloy that can be readily joined both to the pole piece 420 and to ceramic members. The lower end of the seal member 461 has an outwardly directed flange 462 thereon extending therearound and disposed against the outer wall of the pole piece 420 and hermetically sealed thereto as by brazing or the like. The upper end of the seal member 461 has a flange 463 surrounding the lower end of an insulator 464 that is preferably formed of ceramic, the insulator 464 being cylindrical in shape and having an opening therein receiving the conductor 444 therethrough. The connector 453 on the upper end of the conductor 444 is hermetically sealed to the upper end of the insulator 464 by a second seal member 465, whereby to complete the end structure 460.

The second end structure 470 is provided at the lower end of the anode 411, the end structure 470 including a first seal member 471 preferably formed of "Fernico" alloy that can be readily joined both to the metallic pole piece 420A and to ceramic members. More particularly, the seal member 471 includes a radially and outwardly extending flange 472 disposed in a complementarily shaped recess 424A in the lower end of the pole piece 420A, the flange 472 being mechanically connected and hermetically sealed with respect to the pole piece 420A. Extending downwardly from the seal member 471 is a flange 473 that extends about and completely encircles a cooperating insulator 474 formed of ceramic, the flange 473 being mechanically connected to and hermetically sealed with respect to the insulator 474. The insulator 474 also surrounds and supports the connector 456 and is sealed at the lower end thereof to the outwardly extending flange 456b thereon to form a hermetic connection therebetween. A second cylindrical insulator 475 is disposed with the upper surface thereof against a lower surface of the flange 456b and hermetically sealed thereto and receiving therethrough the lower end of the conductor 455. Finally, a second seal member 476 is provided to form a mechanical connection and hermetic seal between the lower end of the insulator 475 and the connector 458.

It will be understood that each end structure 460 and 470 hermetically seals the associated end of the device 410 and also provides electrical connections between parts where desired, while providing electrical insulation between other parts where necessary. Further, it is often desirable to provide gaskets or other like constructions between contacting surfaces when formed of different materials, all as is well understood in the art.

Referring now to FIG. 17 of the drawings, the manner in which the crossed-field discharge device 410 is incorporated in the oscillator 400 will be described in further detail. A tubular conductor 407 is provided formed of a material that is electrically conductive, the preferred material being aluminum metal; the conductor 407 has an internal diameter slightly greater than the external diameter of the anode 411 and is placed in telescoping relationship with the upper end thereof and is electrically connected thereto, the conductor 407 being disposed within the upper magnetic yoke 442 and extending upwardly to the upper end thereof. The threaded outer end of the connector 453 has threadedly connected thereto the lower end of an output connector 402 extending upwardly therefrom, whereby the connector 402 is connected to the output plate 445 that is capacitively coupled to the rods 430. The tuned cavity for the oscillator 400 is defined by the space between the inner surfaces of the flanges 422 and 422A of the pole pieces 420 and 420A, respectively, the anode 411 and the rods 430 forming a section of a coaxial transmission line, the transmission line being extended with respect to the rods 430 by the pole pieces 420 and 420A, whereby an RF standing wave is provided in the space between the inner surfaces of the flanges 422 and 422A.

The output RF potential from the oscillator 400 appears between the anode 411 and the rods 430, the anode 411 being directly connected to the tubular outer conductor 407 and the rods 430 being capacitively coupled to the output connector 402 via the rod plate 425, the plate 445, the conductor 444 and the connector 453. A pair of coaxial output conductors 480 and 490 is connected respectively to the anode 411 and the rods 430 at one end thereof and to the output transmission line 65 and specifically the outer conductor 66 and the inner conductor 67, respectively. More specifically, the outer conductor 480 is capacitively coupled to the conductor 407 by being arranged in telescoping relationship therewith, a capacitive coupler 485 being provided therebetween and comprising a sleeve 486 formed of a synthetic organic plastic resin, the preferred resin being a tetrafluoroethylene resin sold under the trademark "Teflon." The upper end of the conductor 480 extends through an opening 66a in the outer conductor 66 and carries an outwardly directed flange 481 thereon that is mechanically and electrically secured to the outer conductor 66.

The inner conductor 480 resiliently engages the terminal 402 and has a threaded projection 491 on the upper end thereof that extends through an opening in the inner conductor 67 and threadedly engages a complementarily shaped opening in an insulator 492, the insulator 492 preferably being formed of a synthetic organic plastic resin, the preferred resin being tetrafluoroethylene resin sold under the trademark "Teflon." The insulator 492 is held in the desired position with respect to the outer conductor 66 by a screw 493 engaging in a complementarily shaped opening in the insulator 492. By the described connection, the B+ potential on the anode 411 is insulated from the outer conductor 66 of the output transmission line 65, while the RF energy between the output conductors 407 and the terminal 402 is applied between the conductor 66 and 67, respectively, of the output transmission line 65.

The B− potential for the cathode 440 and the low voltage AC supply for the heater 451 is applied to low voltage AC supply for the heater 451 is applied to the oscillator 400 at the lower end of the device 411 as viewed in FIG. 17. More particularly, the connector 458 has the outer end thereof threaded and is in turn threadedly received in a complementarily threaded end of a terminal 403, the terminal 403 extending downwardly below the lower end of the magnetic yoke 446. A tubular conductor 408 is also provided formed of a material that is electrically conductive, the preferred material being aluminum metal; the conductor 408 has an internal diameter slightly greater than the external diameter of the anode 411 and is placed in telescoping relationship with the lower end thereof and is electrically connected thereto, the conductor 408 being disposed within the lower magnetic yoke 436 and extending downwardly to a point slightly below the lower end thereof. In order to prevent the introduction of RF energy from the oscillator 400 into the associated power of supply 51, it is desirable to provide a pair of feed-through filter capacitors 488 as diagrammatically illustrated in FIG. 17 connected between the output terminal 403 and the outer conductor 408 and between the output terminal 456b and the conductor 408. Each of the capacitors 444 is in the form of two layers of conductive foil between which are interposed layers of insulating film, the layers of conductive foil and insulating film being rolled to provide a capacitor of high capacitance, each of the capacitors 488 having an output terminal 489 that is connected internally to an input terminal 489a, the terminals 489 and 489a being connected to one of the conductive foils, the other one of the conductive foils being connected to a second input terminal 489b. As illustrated, the terminal 403 is connected by a conductor 494 to the input terminal 489a of one of the filter capacitors 488, and the conductor 408 is connected by a conductor 495 to the other input terminal 489b of the filter capacitor 488. The output terminal of the filter capacitor 488 is connected to the conductor 61 from the power supply 51, the conductor 61 being connected both to the source of B− potential and to one of the terminals for the low voltage AC heater supply. The output terminal 456b connected to the other end of the heater 451 is connected by a conductor 496 to the input terminal 489a of the other filter capacitor 488, and the conductor 408 is connected by a conductor 497 to the other input terminal 489b of the associated filter capacitor 488; and the output terminal 489 of the other filter capacitor 488 is connected to the conductor 62 from the power supply 51, the conductor 62 being connected to the other terminal for the low voltage AC heater supply.

During the operation of the oscillator 400, the anode 411 and the rods 430 within the device 410 cooperate to provide a portion of a coaxial transmission line, the coaxial transmission line thus formed being extended at the lower end by the anode 411 and the pole piece 420A and being extended at the upper end by the anode 411 and the pole piece 420, the thus formed coaxial transmission line being terminated at the upper end by the connection between the pole piece flange 422 and the anode 411 and being terminated at the lower end by the connection between the pole piece flange 422A and the anode 411. Termination of the coaxial transmission line forms a tuned cavity which determines the frequency of operation of the oscillator 400, the distance between the inner surfaces of the flanges 422 and 422A being equivalent to ½ of the wavelength of the frequency of operation of the ocillator 400, the mechanical distance being substantially less than the electrical distance because of the high capacitance between the anode 411 and the rods 430. Having arranged and connected the parts as illustrated in FIG. 17, operation of the oscillator 400 depends only upon the application of the necessary operating potentials thereto via the conductors 60, 61 and 62. The anode current thereof from the connection 439 to the magnet coils 435 and 431 into the conductor 60 establishes the necessary unidirectional magnetic field through the interaction space 450, the unidirectional magnetic field extending axially through the interaction space 450. The unidirectional electrical field normal to the axis of the device 410 is created by the application of the B+ and B− potentials to the anode and the cathode, respectively, via the conductors 60 and 61, respectively.

Immediately upon the application of the operating potentials to the oscillator 400, a standing RF wave is established within the device 410 and extending between the inner surfaces of the pole pieces flanges 422 and 422A and through the interaction space 450. It is believed that there is associated with the RF standing wave an RF electrical field extending normal to the axis of the device 410 and disposed primarily between the anode 411 and the rods 430, with a small portion of the RF electrical field extending between the anode 411 and the cathode 440, and a still smaller portion of the RF electrical field extending between the anode 430 and the cathode 440. There further is believed to be associated with the standing RF wave an RF magnetic field also normal to the axis of the device 410 and likewise normal to the RF electrical field, the RF magnetic field being fundamentally disposed about and encircling the rods 430 within the anode recesses 415, and also extending inwardly into the interaction space 450 and to the cathode 440. Electrons emitted from the cathode 440 are directed into spiral paths by interaction with the fields in the interaction space 450, and during the travel of the electrons to the anode 411 and the rods 430 a portion of the energy content of the electrons is imparted to the RF standing wave to reinforce the RF standing wave and to add energy thereto. A portion of the RF standing wave is withdrawn from the oscillator 400 through the output transmission line 65, the RF energy being introduced thereto by the coupling between the concentric conductors 480 and 490 to the anode 411 and the rods 430, respectively, the conductor 480 being capacitively coupled by the coupler 485 to the anode 411 and the conductor 490 being capacitively coupled to the rods 430 via the terminal 402 connected to the connector 453, the conductor 444 and the plate 445 that is capacitively coupled to the rod plate 425.

As has been explained above, the RF wave present within the oscillator 400 extends axially with respect to the device 410, there being no radial RF waves within the device 410, i.e., no RF waves extending normal to the axis of the device 410. Furthermore, the radial distance between the outer surface of the cathode 440 and the outermost point on the wall 419 of the recesses 460 is less than that required to accommodate a radial standing wave at the operating frequency of the oscillator 400.

From the above it will be seen that there have been provided improved crossed-field discharge devices, improved couplers and filter structures therefor, improved microwave oscillator circuits incorporating the crossed-field discharge devices therein, and improved amplifier circuits incorporating the crossed-field discharge devices therein which fulfill all of the objects and advantages set forth above. More particularly, there have been provided improved crossed-field discharge devices for use at microwave frequencies which are of simple and economical construction and arrangement, the devices being particularly adapted for operation with low applied potentials between the anode and the cathode thereof. The improved crossed-field discharge devices provide a high output of microwave energy in proportion to the physical dimensions thereof, whereby to permit the miniaturization of microwave circuits employing the improved crossed-field discharge devices of the present invention.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A crossed-field discharge device comprising an anode structure defining an axially extending space, a plurality of axially extending anode segments on said anode structure and projecting radially into said axially extending space and providing a corresponding plurality of axially extending anode recesses therebetween, a pair of pole pieces respectively arranged adjacent to the opposite ends of said anode structure and including portions overlying and in axial alignment with said anode recesses, a plurality of rods respectively mounted on said portions of both of said pole pieces and extending therebetween and electrically connected thereby, said rods respectively extending axially in said anode recesses and respectively spaced from the adjacent ones of said anode segments, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, a pair of end caps respectively interconnecting said anode structure and the adjacent one of said pole pieces and closing the annular space disposed therebetween to terminate the coaxial transmission line provided by said anode structure and said rods thereby to define a frequency determining resonant cavity for said device, and end structures enclosing the ends of said anode structure and said axially extending space.

2. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, the radial distance between the outer surface of said cathode structure and the outermost portion of the adjacent one of said anode recesses being less than that required to accommodate a radial standing wave at the frequency of said resonant cavity, and end structures enclosing the ends of said anode structure and said axially extending space.

3. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, the radial extent of said anode recesses being of the same order of magnitude as the circumferential width thereof at the inner edges of said anode segments, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space.

4. The crossed-field discharge device set forth in claim 3, wherein said anode recesses are substantially rectangular in shape as viewed along the axes of said device.

5. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, said anode segments extending radially inwardly beyond the innermost surfaces of the associated rods, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space.

6. A crossed-field discharge device set forth in claim 5, wherein said anode recesses are substantially square as viewed in a direction axially of said device, and said rods are substantially circular in cross section.

7. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, said anode structure and said pole pieces and said rods being symmetrical about a plane normal to the axis of said anode structure midway between the ends thereof, and end structures enclosing the ends of said anode structure and said axially extending space.

8. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, said anode structure and said pole pieces and said rods and said emissive element being symmetrical about a plane normal to the axis of said anode structure midway between the ends thereof, and end structures enclosing the ends of said anode structure and said axially extending space.

9. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including a plurality of circumferentially spaced electron emissive sections corresponding in number to the sum of the number of said anode sections and the number of said rods and disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space.

10. The crossed-field discharge device set forth in claim 9, wherein said electron emissive sections are equal in number to the sum of the number of said anode sections and the number of said rods and are respectively arranged adjacent to one of said anode segments and said rods.

11. The crossed-field discharge device set forth in claim 9, wherein said electron emissive sections are circumferentially spaced apart a distance corresponding generally to the circumferential dimension thereof.

12. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including a plurality of circumferentially spaced protrusions corresponding in number to the sum of the number of said anode sections and the number of said rods and disposed within said anode structure and adjacent to the inner portion of said interaction space, at least the outermost surface portions of said protrusions being an electron emissive material, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space.

13. The crossed-field discharge device set forth in claim 12, wherein said electron emissive portions have a circumferential extent of approximately 25% to 60% of the circumferential distance between the centers of adjacent electron emissive portions.

14. The crossed-field discharges device set forth in claim 12, wherein the radial dimensions of each of said protrusions is greater than about 20% of the spacing between said anode structure and said cathode structure.

15. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends there, an axially extending cathode structure disposed in said axially extending space and cooperating with said anode structure to define an axially extending annular interaction space, said cathode structure including a plurality of circumferentially spaced electron emissive sections equal in number to the sum of the number of said anode sections and the number of said rods and disposed within said anode structure and adjacent to the inner portion of said interaction space, said electron emissive sections being symmetrically circumferentially located relative to the associated anode sections and rods, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space.

16. The crossed-field discharge device set forth in claim 15, wherein the center line of each electron emissive section is circumferentially displaced relative to the center line of the corresponding one of said anode segments and rods between 0% and approximately 45% of the circumferential spacing between the center line of an anode segment and the center line of an adjacent rod.

17. The crossed-field discharge device set forth in claim 15, wherein the center line of each electron emissive section is circumferentially displaced relative to the center line of the corresponding one of said anode segments and rods between 25% and approximately 45% of the circumferential spacing between the center line of an anode segment and the center line of an adjacent rod.

18. The crossed-field discharge device set forth in claim 15, wherein the center line of each of said electron emissive sections is circumferentially displaced relative to the center line of the corresponding one of said anode segments and rods between approximately 35% and 45% of the spacing between the center line of an anode segment and the center line of an adjacent rod and on the downstream side of the corresponding anode segment or rod relative to the normal initial electron flow from said electron emissive sections toward said anode segments and said rods in said device.

19. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof, an axially extending cathode structure disposed in said axially extending space and cooperating with said anode structure to define an axially extending annular interaction space, said cathode structure including a conically shaped electron emissive element disposed within said anode structure and adjacent to the inner portion of said interaction space and extending substantially the length thereof with the axis of said element extending axially of said device, and end structures enclosing the ends of said anode structure and said axially extending space, said anode structure and said rods and said interconnecting means defining a frequency determining resonant cavity for said device.

20. The crossed-field discharge device set forth in claim 19, wherein said emissive element is shaped as a section of a regular right cone having the ends thereof disposed within the ends of said anode structure.

21. A microwave oscillator comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, both said anode segments and said rods receiving electrons from said cathode structure and cooperating therewith to define the fields in said interaction space, and end structures enclosing the ends of said anode structure and said axially extending space, said anode structure and said rods and said interconnecting means defining a frequency determining resonant cavity for said device; means for producing a unidirectional magnetic field extending axially through said axially extending space; and means for producing a unidirectional electrical field between said anode structure and said cathode structure.

22. A microwave oscillator comprising a crossed-field discharge including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space; means for producing a unidirectional magnetic field extending axially through said axially extending space; and means for producing a unidirectional electrical field between said anode structure and said cathode structure.

23. A microwave oscillator comprising a crossed-field discharge device including an anode structure defining an axially extending space, a plurality of axially extending anode segments on said anode structure and projecting radially into said axially extending space and providing a corresponding plurality of axially extending anode recesses therebetween, a pair of pole pieces respectively arranged adjacent to the opposite ends of said anode structure and including portions overlying and in axial alignment with said anode recesses, a plurality of rods respectively mounted on said portions of said pole pieces and respectively extending axially in said anode recesses and respectively spaced from the adjacent ones of said anode segments, means electrically interconnecting said rods at corresponding ends thereof, an axially extending cathode structure disposed in said axially extending space an cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space; means for producing a unidirectional magnetic field extending axially through said axially extending space; and means for producing a unidirectional electrical field between said anode structure and said cathode structure.

24. A microwave oscillator comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, the radial distance between the outer surface of said cathode structure and the outermost portion of the adjacent one of said anode recesses being less than that required to accommodate a radial standing wave at the frequency of said resonant cavity, and end structures enclosing the ends of said anode structure and said axially extending space; means for producing a unidirectional magnetic field extending axially through said axially extending space; and means for producing a unidirectional electrical field between said anode structure and said cathode structure.

25. A microwave amplifier comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof within said axially extending space, an axially extending cathode structure disposed in said axially extending space and cooperating with said anode structure to define an axially extending annular interaction space, said cathode structure including an electron emissive element disposed within said anode structure and adjacent to the inner portion of said interaction space, and end structures enclosing the ends of said anode structure and said axially extending space; a microwave input coupled between said anode structure and said cathode structure at one end of said device; a microwave output coupled between said anode structure and said cathode structure at the other end of said device; means for producing a unidirectional magnetic field extending axially through said axially extending space; and means for producing a unidirectional electrical field between said anode structure and said cathode structure; whereby a microwave signal fed to the input of said amplifier at said one end of said device is amplified thereby and the amplified microwave signal appears at the output of said amplifier at the other end of said device.

26. A microwave amplifier comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space; a microwave input coupled between said anode structure and said cathode structure at one end of said device; a microwave output coupled between said anode structure and said cathode structure at the other end of said device; means for producing a unidirectional magnetic field extending axially through said axially extending space; and means for producing a unidirectional electrical field between said anode structure and said cathode structure; whereby a microwave signal fed to the input of said amplifier at said one end of said device is amplified thereby and the amplified microwave signal appears at the output of said amplifier at the other end of said device.

27. A microwave amplifier comprising a crossed-field discharge device including an anode structure defining an axially extending space, a plurality of axially extending anode segments on said anode structure and projecting radially into said axially extending space and providing a corresponding plurality of axially extending anode recesses therebetween, a pair of pole pieces respectively arranged adjacent to the opposite ends of said anode structure and including portions overlying and in axial alignment with said anode recesses, a plurality of rods respectively mounted on said portions of said pole pieces respectively extending axially in said anode recesses and respectively spaced from the adjacent ones of said anode segments, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space; a microwave input coupled between said anode structure and said cathode structure at one end of said device; a microwave output coupled between said anode structure and said cathode structure at the other end of said device; means for producing a unidirectional magnetic field extending axially through said axially extending space; and means for producing a unidirectional electrical field between said anode structure and said cathode structure; whereby a microwave signal fed to the input of said amplifier at said one end of said device is amplified thereby and the amplified microwave signal appears at the output of said amplifier at the other end of said device.

28. A microwave amplifier comprising a crossed-field discharge device incluidng an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, the radial distance between the outer surface of said cathode structure and the outermost portion of the adjacent one of said anode recesses being less than that required to accommodate a radial standing wave at the frequency of said resonant cavity, and end structures enclosing the ends of said anode structure and said axially extending space; a microwave input coupled between said anode structure and said cathode structure at one end of said device; a microwave output coupled between said anode structure and said cathode structure at the other end of said device; means for producing a unidirectional magnetic field extending axially through said axially extending space; and means for producing a unidirectional electrical field between said anode structure and said cathode structure; whereby a microwave signal fed to the input of said amplifier at said one end of said device is amplified thereby and the amplified microwave signal appears at the output of said amplifier at the other end of said device.

29. A microwave amplifier comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof within said axially extending space, an axially extending cathode structure disposed in said axially extending space and cooperating with said anode structure to define an axially extending annular interaction space, said cathode structure including a conically shaped electron emissive element disposed within said anode structure and adjacent to said inner portion of said interaction space with the axis of said element extending axially of said device, end structures enclosing the ends of said anode structure and said axially extending space; a microwave input coupled between said anode structure and said cathode structure at the end of said device adjacent to the smaller end of said element; a microwave output coupled between said anode structure and said cathode structure at the end of said device adjacent to the larger end of said element; means for producing a unidirectional magnetic field extending axially through said axially extending path; and means for producing a unidirectional electrical field between said anode structure and said cathode structure; whereby the microwave signal fed to the input of said amplifier is amplified thereby and the amplified microwave signal appears at the output of said amplifier.

30. A microwave coupling structure comprising a pair of RF input terminals for connection to a source of RF potential, a pair of DC input terminals for connection to a source of DC potential, a pair of output terminals for connection to a load for RF energy, means providing a DC connection between one of said DC input terminals and one of said RF input terminals, an RF rejection filter interconnecting the other of said DC input terminals and the other of said RF input terminals and providing a DC connection therebetween, and means capacitively coupling said RF input terminals respectively to said RF output terminals.

31. A microwave coupling structure comprising a pair of RF input terminals for connection to a source of RF potential, a pair of DC input terminals for connection to a source of DC potential, a pair of output terminals for connection to a load for RF energy, means providing a DC connection between one of said DC input terminals and one of said RF input terminals, means providing a DC connection between the other of said DC input terminals and the other of said RF input terminals, an RF by-pass filter connected between said DC input terminals, and means capacitively coupling said RF input terminals respectively to said RF output terminals.

32. A microwave coupling structure comprising a pair of RF input terminals for connection to a source of RF potential, a pair of DC input terminals for connection to a source of DC potential, a pair of output terminals for connection to a load for RF energy, means providing a DC connection between one of said DC input terminals and one of said RF input terminals, an RF rejection filter interconnecting the other of said DC input terminals and the other of said RF input terminals and providing a DC connection therebetween, an RF by-pass filter connected between said DC input terminals, and means capacitively coupling said RF input terminals respectively to said RF output terminals.

33. A microwave coupling structure for coupling microwave energy at a predetermined frequency comprising a pair of RF input terminals for connection to a source of RF potential having said predetermined frequency, a pair of DC input terminals for connection to a source of DC potential, a pair of output terminals for connection to a load for RF energy, means providing a DC connection between one of said DC input terminals and one of said RF input terminals, an RF rejection filter interconnecting the other of said DC input terminals and the other of said RF input terminals and providing a DC connection therebetween while providing a high impedance path for said predetermined frequency, an RF by-pass filter connected between said RF input terminals providing a low impedance path for the second and higher harmonics of said predetermined frequency, and means capacitively coupling said RF input terminals respectively to said RF output terminals.

34. A microwave coupling structure for coupling microwave energy at a predetermined frequency comprising a pair of RF input terminals for connection to a source of RF potential having said predetermined frequency, a pair of DC input terminals for connection to a source of DC potential, a pair of output terminals for connection to a load for RF energy, means providing a DC connection between one of said DC input terminals and one of said RF input terminals, means providing a DC connection between the other of said DC input terminals and the other of said RF input terminals, a first RF by-pass filter connected between said DC input terminals providing a low impedance path for said predetermined frequency and higher frequencies, a second RF by-pass filter connected between said RF input terminals providing a low impedance path for the second and higher harmonics of said predetermined frequency, and means capacitively coupling said RF input terminals respectively to said RF output terminals.

35. A microwave coupling structure for coupling microwave energy at a predetermined frequency comprising a pair of RF input terminals for connection to a source of RF potential having said predetermined frequency, a pair of DC input terminals for connection to a source of DC potential, a pair of output terminals for connection to a load for RF energy, means providing a DC connection between one of said DC input terminals and one of said RF input terminals, an RF rejection filter interconnecting the other of said DC input terminals and the other of said RF input terminals and providing a DC connection therebetween while providing a high impedance path for said predetermined frequency, a first RF by-pass filter connected between said DC input terminals providing a low impedance path for said predetermined frequency and higher frequencies, a second RF by-pass filter connected between said RF input terminals providing a low impedance path for the second and higher harmonics of said predetermined frequency, and means capacitively coupling said RF input terminals respectively to said RF output terminals.

36. A microwave coupling structure for coupling potentials to a crossed-field discharge device having a cathode connection disposed within an annular anode connection, said structure comprising a first annular outer conductor for connecting to the anode connection, a first inner conductor disposed within said first outer conductor for connecting to the cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween, an RF rejection filter interconnecting said second inner conductor and said second DC input terminal to provide a DC connection therebetween while preventing RF coupling therebetween, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third outer conductor and said annular inner conductor providing RF output terminals for said coupling structure.

37. The microwave coupling structure set forth in claim 36, wherein the axes of said first and second outer conductors are disposed substantially normal to each other.

38. A microwave coupling structure for coupling potentials to a crossed-field discharge device having a cathode connection disposed within an annular anode connection, said structure comprising a first annular outer conductor for connecting to the anode connection, a first inner conductor disposed within said first outer conductor for connecting to the cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween, a cylindrical choke disposed within said second outer conductor and surrounding a predetermined length of said second inner conductor and spaced therefrom, means interconnecting said second inner conductor and said second DC input terminal and the end of said choke disposed away from said first outer conductor to provide a DC connection therebetween, said second inner conductor and said choke and said second outer conductor cooperating to provide an RF rejection filter for preventing RF coupling between said second inner conductor and said second DC input terminal, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third outer conductor and said annular inner conductor providing RF output terminals for said coupling structure.

39. The microwave coupling structure set forth in claim 38, wherein the length of said cylindrical choke is equal to ¼ of the wavelength of the RF energy applied to said RF input terminals.

40. A microwave coupling structure for coupling potentials to a crossed-field discharge device having a cathode connection disposed within an annular anode connection, said structure comprising a first annular outer conductor for connecting to the anode connection, a first inner conductor disposed within said first outer conductor for connecting to the cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween, means interconnecting said second inner conductor and said second DC input terminal to provide a DC connection therebetween, an RF by-pass filter connected between said DC input terminals, a third annular outer conductor concentrically arranged with repect to said first outer conductor and electrically insulated therefrom and capacitively coupled thereto, and an annular inner conductor having said first inner conductor extending thereinto and electrically insulated therefrom and capacitively coupled thereto, and an annular inner conductor having said first inner conductor extending thereinto and electrically insulated therefrom and capacitively coupled thereto, said third outer conductor and said annular inner conductor providing RF output terminals for said coupling structure.

41. A microwave coupling structure for coupling potentials to a crossed-field discharge device having a cathode connection disposed within an annular anode connection, said structure comprising a first annular outer conductor for connecting to the anode connection, a first inner conductor disposed within said first outer conductor for connecting to the cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween, an RF rejection filter interconnecting said second inner conductor and said second DC input terminal to provide a DC connection therebetween while preventing RF coupling therebetween, an RF by-pass filter connected between said DC input terminals, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third outer conductor and said annular inner conductor providing RF output terminals for said coupling structure.

42. A microwave coupling structure for coupling operating potentials to and for coupling microwave energy at a predetermined frequency from a crossed-field discharge device having a cathode connection disposed within an annular anode connection, said structure comprising a first annular outer conductor for connecting to the anode connection, a first inner conductor disposed within said first outer conductor for connecting to the cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween, an RF rejection filter interconnecting said second inner conductor and said second DC input terminal to provide a DC connection therebetween while preventing RF coupling therebetween, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third annular outer conductor overlapping said first outer conductor a distance equivalent to ¼ of the wavelength of the predetermined frequency and said annular inner conductor overlapping said first inner conductor a distance equal to ¼ of the wavelength of the predetermined frequency to establish an RF by-pass filter connection between said RF input terminals providing a low impedance path for the second and higher harmonics of the predetermined frequency, said third outer conductor and said annular inner conductor providing RF output terminals for said coupling structure.

43. A microwave coupling structure for coupling operating potentials to and for coupling microwave energy at a predetermined frequency from a crossed-field discharge device having a cathode connection disposed within an annular anode connection, a first annular outer conductor for connecting to the anode connection, a first inner conductor disposed within said first outer conductor for connecting to the cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween, an RF by-pass filter connected between said DC input terminals providing a low impedance path for the predetermined frequency and higher frequencies, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third annular outer conductor overlapping said first outer conductor a distance equivalent to ¼ of the wavelength of the predetermined frequency and said annular inner conductor overlapping said first inner conductor a distance equal to ¼ of the wavelength of the predetermined frequency to establish an RF by-pass filter connection between said RF input terminals providing a low impedance path for the second and higher harmonics of the predetermined frequency, said third outer conductor and said annular inner conductor providing RF output terminals for said coupling structure.

44. A microwave coupling structure for coupling operating potentials to and for coupling microwave energy at a predetermined frequency from a crossed-field discharge device having a cathode connection disposed within an annular anode connection, a first annular outer conductor for connecting to the anode connection, a first inner conductor disposed within said first outer conductor for connecting to the cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween, an RF rejection filter interconnecting said second inner conductor and said second DC input terminal to provide a DC connection therebetween while preventing RF coupling therebetween, an RF by-pass filter connected between said DC input terminals providing a low impedance path for the predetermined frequency and higher frequencies, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third annular outer conductor overlapping said first outer conductor a distance equivalent to ¼ of the wavelength of the predetermined frequency and said annular inner conductor overlapping said first inner conductor a distance equal to ¼ of the wavelength of the predetermined frequency to establish an RF by-pass filter connection between said RF input terminals providing a low impedance path for the second and higher harmonics of the predetermined frequency, said third outer conductor and said annular inner conductor providing RF output terminals for said coupling structure.

45. A microwave assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structure closing the ends of said anode structure and said axially extending space, said anode structure including an anode connection extending outwardly beyond one of said end structures and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; and a microwave coupling structure including a pair of RF input terminals connected respectively to said anode connection and said cathode connection, a pair of DC input terminals for connection to a source of DC potential, a pair of output terminals for connection to a load for RF energy, means providing a DC connecttion between one of said DC input terminals and said anode connection via one of said RF input terminals, an RF rejection filter interconnecting the other of said DC input terminals and said cathode connection via the other of said RF input terminals and providing a DC connection therebetween, and means capacitively coupling said RF input terminals respectively to said RF output terminals.

46. A mircowave assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an anode connection extending outwardly beyond one of said end structures and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; and a microwave coupling structure including a pair of RF input terminals connected respectively to said anode connection and said cathode connection, a pair of DC input terminals for connection to a source of DC potential, a pair of output terminals for connection to a load for RF energy, means providing a DC connection between one of said DC input terminals and said anode connection via one of said RF input terminals, means providing a DC connection between the other of said DC input terminals and said cathode connection via the other of said RF input terminals, an RF by-pass filter connected between said DC input terminals, and means capacitively coupling said RF input terminals respectively to said RF output terminals.

47. A microwave assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an anode connection extending outwardly beyond one of said end structures and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; and a microwave coupling structure including a pair of RF input terminals connected respectively to said anode connection and said cathode connection, a pair of DC input terminals for connection to a source of DC potential, a pair of output terminals for connection to a load for RF energy, means providing a DC connection between one of said DC input terminals and said anode connection via one of said RF input terminals, an RF rejection filter interconnecting the other of said DC input terminals and said cathode connection via the other of said RF input terminals and providing a DC connection therebetween, an RF by-pass filter connected between said DC input terminals, and means capacitively coupling said RF input terminals respectively to said RF output terminals.

48. A microwave assembly comprising a crossed-field discharge device for operating at a predetermined frequency and including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for estabilshing an axially extending RF wave having the predetermined frequency in said axially extending space and having associated therewith RF electrical fields and RF magnetic fields normal to the axis of said device and extending into said interaction space, and end structures closing the ends of said anode structure and said axially extending space, said anode structure including an anode connection extending outwardly beyond one of said end structures and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; and a microwave coupling structure including a pair of RF input terminals connected respectively to said anode connection and said cathode connection, a pair of DC input terminals for connection to a source of DC potential, a pair of RF output terminals for connection to a load for RF energy, means providing a DC connection between one of said DC input terminals and said anode connection via one of said RF input terminals, an RF rejection filter interconnecting the other of said DC input terminals and said cathode connection via the other of said RF input terminals and providing a DC connection therebetween while providing a high impedance path for the predetermined frequency, an RF by-pass filter connected between said RF input terminals providing a low impedance path for the second and higher harmonics of the predetermined frequency, and means capacitively coupling said RF input terminals respectively to said RF output terminals.

49. A microwave assembly comprising a crossed-field discharge device for operating at a predetermined frequency and including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave having the predetermined frequency in said axially extending space and having associated therewith RF electrical fields and RF magnetic fields normal to the axis of said device and extending into said interaction space, and end structures closing the ends of said anode structure and said axially extending space, said anode structure including an anode connection extending outwardly beyond one of said end structures and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; and a microwave coupling structure including a pair of RF input terminals connected respectively to said anode connection and said cathode connection, a pair of DC input terminals for connection to a source of DC potential, a pair of RF output terminals for connection to a load for RF energy, means providing a DC connection between one of said DC input terminals and said anode connection via one of said RF input terminals, a first RF by-pass filter connected between said DC input terminals providing a low impedance path for the predetermined frequency and higher frequencies, a second RF by-pass filter connected between siad RF input terminals providing a low impedance path for the second and higher harmonics of the predetermined frequency, and means capacitively coupling said RF input terminals respectively to said RF output terminals.

50. A microwave assembly comprising a crossed-field discharge device for operating at a predetermined frequency and including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave having the predetermined frequency in said axially extending space and having associated therewith RF electrical fields and RF magnetic fields normal to the axis of said device and extending into said interaction space, and end structures closing the ends of said anode structure and said axially extending space, said anode structure including an anode connection extending outwardly beyond one of said end structures and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; and a microwave coupling structure including a pair of RF input terminals connected respectively to said anode connection and said cathode connection, a pair of DC input terminals for connection to a source of DC potential, a pair of RF output terminals for connection to a load for RF energy, means providing a DC connection between one of said DC input terminals and said anode connection via one of said RF input terminals, an RF rejection filter interconnecting the other of said DC input terminals and said cathode connection via the other of said RF input terminals and providing a DC connection therebetween while providing a high impedance path for the predetermined frequency, a first RF by-pass filter connected between said DC input terminals providing a low impedance path for the predetermined frequency and higher frequencies, a second RF by-pass filter connected between said RF input terminlas providing a low impedance path for the second and higher harmonics of the predetermined frequency, and means capacitively coupling said RF input terminals respectively to said RF output terminals.

51. A microwave oscillator assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, means including said anode structure and said pole pieces defining a frequency determining resonant cavity for said device, said anode structure including an anode connection extending outwardly beyond one of said end structures and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; and a microwave coupling structure including a pair of RF input terminals connected respectively to said anode conection and said cathode connection, a pair of DC input terminals for connection to a source of DC potential, a pair of RF output terminals for connection to a load for RF energy, means providing a DC connection between one of said DC input terminals and said anode connection via one of said RF input terminals, an RF rejection filter interconnecting the other of said DC input terminals and said cathode connection via the other of said RF input terminals and providing a DC connection therebetween while providing a high impedance path for the operating frequency of said device, a first RF by-pass filter connected between said DC input terminals and providing a low impedance path for said operating frequency and higher frequencies, a second RF by-pass filter connected between said RF input terminals and providing a low impedance path for the second and higher harmonics of said operation frequency, and means capacitively coupling said RF input terminals respectively to said RF output terminals.

52. A microwave assembly comprising a crossed-field discharge device including an anode structure defining an axially extending space, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an anode connection extending outwardly beyond one of said end structure and said cathode structure including a cathode connection extending outwardly beyond said one end of structure, said anode connection and said cathode connection cooperating to provide output connections for said device for removing RF energy from said axially extending space utilizing said cathode structure as a probe interacting with said RF fields; means for producing a
DC magnetic field extending axially through said axially
extending space; a voltage doubler and rectifier circuit
having a pair of DC output terminals; a coupling structure comprising a pair of RF input terminals connected
respectively to said anode connection and said cathode
connection, a pair of DC input terminals coupled respectively to the DC output terminals of said voltage doubler
and rectifier circuit, a pair of RF output terminals for
connection to a load for RF energy, means providing a
DC connection between one of said DC input terminals
and said anode connection via the associated one of said
RF input terminals, an RF rejection filter interconnecting
the other of said DC input terminals and said cathode
connection via the other of said RF input terminals and
providing a DC connection therebetween, and means
capacitively coupling said RF input terminals respectively
to said RF output terminals; and means connecting one
of said RF output terminals to electrical ground.

53. A microwave assembly comprising a crossed-field
discharge device including an anode structure defining an
axially extending space, an axially extending cathode
structure disposed in said axially extending space and
cooperating with said anode structure to define an axially
extending annular interaction space, means for establishing an axially extending RF wave in said axially extending space and having associated therewith RF electrical
fields and RF magnetic fields normal to the axis of said
device and extending into said interaction space, and end
structures closing the ends of said anode structure and
said axially extending space, said anode structure including an anode connection extending outwardly beyond one
of said end structure and said cathode structure including
a cathode connection extending outwardly beyond said
one end structure, said anode connection and said cathode
connection cooperating to provide output connections for
said device for removing RF energy from said axially
extending space utilizing said cathode structure as a probe
interacting with said RF fields; means for producing a
DC magnetic field extending axially through said axially
extending space; a voltage doubler and rectifier circuit
having a pair of DC output terminals; a coupling structure comprising a pair of RF input terminals connected
respectively to said anode connection and said cathode
connection, a pair of DC input terminals coupled respectively to the DC output terminals of said voltage doubler
and rectifier circuit, a pair of RF output terminals for
connection to a load for RF energy, means providing a
DC connection between one of said DC input terminals
and said anode connection via the associated one of said
RF input terminals, means providing a DC connection
between the other of said DC input terminals and said
cathode connection via the other of said RF input terminals, an RF by-pass filter connected between said DC
input terminals, and means capacitively coupling said RF
input terminals respectively to said RF output terminals;
and means connecting one of said RF output terminals
to electrical ground.

54. A microwave assembly comprising a crossed-field
discharge device including an anode structure defining an
axially extending space, an axially extending cathode
structure disposed in said axially extending space and
cooperating with said anode structure to define an axially
extending annular interaction space, means for establishing an axially extending RF wave in said axially extending space and having associated therewith RF electrical
fields and RF magnetic fields normal to the axis of said
device and extending into said interaction space, and end
structures closing the ends of said anode structure and
said axially extending space, said anode structure including an anode connection extending outwardly beyond one
of said end structure and said cathode structure including
a cathode connection extending outwardly beyond said
one end structure, said anode connection and said cathode
connection cooperating to provide output connections for
said device for removing RF energy from said axially
extending space utilizing said cathode structure as a probe
interacting with said RF fields; means for producing a
DC magnetic field extending axially through said axially
extending space; a voltage doubler and rectifier circuit
having a pair of DC output terminals; a coupling structure comprising a pair of RF input terminals connected
respectively to said anode connection and said cathode
connection, a pair of DC input terminals coupled respectively to the DC output terminals of said voltage doubler
and rectifier circuit, a pair of RF output terminals for
connection to a load for RF energy, means providing a
DC connection between one of said DC input terminals
and said anode connection via the associated one of said
RF input terminals, an RF rejection filter interconnecting
the other of said DC input terminals and said cathode
connection via the other of said RF input terminals and
providing a DC connection therebetween, an RF by-pass
filter connected between said DC input terminals, and
means capacitively coupling said RF input terminals respectively to said RF output terminals; and means connecting one of said RF output terminals to electrical
ground.

55. A microwave assembly comprising a crossed-field
discharge device operating at a predetermined frequency
and including an anode structure defining an axially extending space, an axially extending cathode structure
disposed in said axially extending space and cooperating
with said anode structure to define an axially extending
annular interaction space, means for establishing an axially extending RF wave having the predetermined frequency in said axially extending space and having associated therewith RF electrical fields and RF magnetic
fields normal to the axis of said device and extending
into said interaction space, and end structures closing
the ends of said anode structure and said axially extending space, said anode structure including an anode connection extending outwardly beyond one of said end
structure and said cathode structure including a cathode
connection extending outwardly beyond said one end
structure, said anode connection and said cathode connection cooperating to provide output connections for
said device for removing RF energy from said axially
extending space utilizing said cathode structure as a probe
interacting with said RF fields; means for producing a
DC magnetic field extending axially through said axially
extending space; a voltage doubler and rectifier circuit
having a pair of DC output terminals; a coupling structure comprising a pair of RF input terminals connected
respectively to said anode connection and said cathode
connection, a pair of DC input terminals coupled respectively to the DC output terminals of said voltage doubler
and rectifier circuit, a pair of RF output terminals for
connection to a load for RF energy, means providing a
DC connection between one of said DC input terminals
and said anode connection via the associated one of said
RF input terminals, an RF rejection filter interconnecting
the other of said DC input terminals and said cathode
connection via the other of said RF input terminals and
providing the DC connection therebetween while providing a high impedance path for the predetermined frequency, and means capacitively coupling said RF input
terminals respectively to said RF output terminals; and
means connecting one of said RF output terminals to
electrical ground.

56. A microwave assembly comprising a crossed-field
discharge device operating at a predetermined frequency
and including an anode structure defining an axially extending space, an axially extending cathode structure disposed in said axially extending space and cooperating with
said anode structure to define an axially extending annular interaction space, means for establishing an axially
extending RF wave having the predetermined frequency
in said axially extending space and having associated
therewith RF electrical fields and RF magnetic fields normal to the axis of said device and extending into said interaction space, and end structures closing the ends of said anode structure and said axially extending space, said anode structure including an anode connection extending outwardly beyond one of said end structure and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; means for producing a DC magnetic field extending axially through said axially extending space; a voltage doubler and rectifier circuit having a pair of DC output terminals; a coupling structure comprising a pair of RF input terminals connected respectively to said anode connection and said cathode connection, a pair of DC input terminals coupled respectively to the DC output terminals of said voltage doubler and rectifier circuit, a pair of RF output terminals for connection to a load for RF energy, means providing a DC connection between one of said DC input terminals and said anode connection via the associated one of said RF input terminals, means providing a DC connection between the other of said DC input terminals and said cathode connection via the other of said RF input terminals, a first RF by-pass filter connected between said DC input terminals providing a low impedance path for the predetermined frequency and higher frequencies, a second RF by-pass filter connected between said RF input terminals providing a low impedance path for the second and higher harmonics of the predetermined frequency, and means capacitively coupling said RF input terminals respectively to said RF output terminals; and means connecting one of said RF output terminals to electrical ground.

57. A microwave assembly comprising a crossed-field discharge device operating at a predetermined frequency and including an anode structure defining an axially extending space, an axially extending cathode structure disposed in said axially extending space and cooperating with said anode structure to define and axially extending annular interaction space, means for establishing an axially extending RF wave having the predetermined frequency in said axially extending space and having associated therewith RF electrical fields and RF magnetic fields normal to the axis of said device and extending into said interaction space, and end structures closing the ends of said anode structure and said axially extending space, said anode structure including an anode connection extending outwardly beyond one of said end structure and said cathode structure including a cathode connection extending outwardly beyond said one end structure, said anode connection and said cathode connection cooperating to provide output connections for said device for removing RF energy from said axially extending space utilizing said cathode structure as a probe interacting with said RF fields; means for producing a DC magnetic field extending axially through said axially extending space; a voltage doubler and rectifier circuit having a pair of DC output terminals; a coupling structure comprising a pair of RF input terminals connected respectively to said anode connection and said cathode connection, a pair of DC input terminals coupled respectively to the DC output terminals of said voltage doubler and rectifier circuit, a pair of RF output terminals for connection to a load for RF energy, means providing a DC connection between one of said DC input terminals and said anode connection via the associated one of said RF input terminals, an RF rejection filter interconnecting the other of said DC input terminals and the other of said RF input terminals and providing the DC connection therebetween while providing a high impedance path for the predetermined frequency, a first RF by-pass filter connected between said DC input terminals providing a low impedance path for the predetermined frequency and higher frequencies, a second RF by-pass filter connected between said RF input terminals providing a low impedance path for the second and higher harmonics of the predetermined frequency, and means capacitively coupling said RF input terminals respectively to said RF output terminals; and means connecting one of said RF output terminals to electrical ground.

58. A microwave assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structure closing the ends of said anode structure and said axially extending space, said anode structure including an annular anode connection extending outwardly beyond one of said end structures and said cathode structure including a cathode connection extending outwardly beyond said one end structure and disposed within said annular anode connection; and a microwave coupling structure including a first annular outer conductor connected to said anode connection, a first inner conductor disposed within said first annular outer condutcor and connected to said cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween and to said anode connection, an RF rejection filter interconnecting said second inner conductor and said second DC input terminal to provide a DC connection therebetween and to said cathode connection while preventing RF coupling therebetween, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third outer conductor and said annular inner conductor providing RF output terminals respectively coupled to said anode structure and said cathode structure for removing RF energy from said axially extending space utilizing said cathode structure as a probe interacting with said RF fields.

59. A microwave assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for estabishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an annular anode connection extending outwardly beyond one of said end structures and said cathode structure including a cathode connection extending outwardly beyond said one end structure and disposed within said annular anode connection; and a microwave coupling structure including a first annular outer conductor connected to said anode connection, a first inner conductor disposed within said first annular outer conductor and connected to said cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween to said anode connection, a cylindrical choke disposed between said second outer conductor and surrounding a predetermined length of said second inner conductor and spaced therefrom, means interconnecting said second inner conductor and said second DC input terminal and the end of said choke disposed away from said first outer conductor to provide a DC connection therebetween and to said cathode connection, said second inner conductor and said choke and said second outer conductor cooperating to provide an RF rejection filter for preventing RF coupling between said second inner conductor and said second DC input terminal, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third outer conductor and said annular conductor providing RF output terminals respctively coupled to said anode structure and said cathode structure for removing RF energy from said axially extending space utilizing said cathode structure as a probe interacting with said RF fields.

60. A microwave assembly set forth in claim 59, wherein the length of said cylindrical choke is equal to ¼ of the wavelength of the RF energy between said anode connection and said cathode connection.

61. A microwave assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an annular anode connection extending outwardly beyond one of said end structures and said cathode structure including a cathode connection extending outwardly beyond said one end structure and disposed within said annular anode connection; and a microwave coupling structure including a first annular outer conductor connected to said anode connection, a first inner conductor disposed within said first annular outer conductor and connected to said cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween and to said anode connection, means interconnecting said second inner conductor and said second DC input terminal to provide a DC connection therebetween and to said cathode connection, an RF by-pass filter connected between said DC input terminals, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third outer conductor and said annular inner conductor providing RF output terminals respectively coupled to said anode structure and said cathode structure for removing RF energy from said axially extending space utilizing said cathode structure as a probe interacting with said RF fields.

62. A microwave assembly comprising a crossed-field discharge device including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an annular anode connection extending outwardly beyond one of said end structures and said cathode structure including a cathode connection extending outwardly beyond said one end structure and disposed within said annular anode connection; and a microwave coupling structure including a first annular outer conductor connected to said anode connection, a first iner conductor disposed within said first annular outer conductor and connected to said cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween and to said anode connection, an RF rejection filter interconnecting said second inner conductor and said second DC input terminal to provide a DC connection therebetween and to said cathode connection while preventing RF coupling therebetween, an RF by-pass filter connected between said DC input terminals, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third outer conductor and said annular inner conductor providing RFR output terminals respectively coupled to said anode structure and said cathode structure for removing RF energy from said axially extending space utilizing said cathode structure as a probe interacting with said RF fields.

63. A microwave assembly comprising a crossed-field discharge device for operating at a predetermined frequency and including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an annular anode connection extending outwardly beyond one of said end structures and said cathode structure including a cathode connection extending outwardly beyond said one end structure and disposed within said annular anode connection; and a microwave coupling structure including a first annular outer conductor connected to said anode connection, a first inner conductor disposed within said first annular outer conductor and connected to said cathode connection, said first outer conductor and said first inner conductor providing RF input terminals to said coupling structure, a second annular outer conductor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween and to said anode connection, an RF rejection filter interconnecting said second inner conductor and said second DC input terminal to provide a DC connection therebetween and to said cathode connection while preventing RF coupling therebetween, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third annular outer conductor overlapping said first outer conductor a distance equivalent to ¼ of the wavelength of the predetermined frequency and said annular inner conductor overlapping said first inner conductor a distance equal to ¼ of the wavelength of the predetermined frequency to establish an RF by-pass filter connection between said RF input terminals providing a low impedance path for the second and higher harmonics of the predetermined frequency, said third outer conductor and said annular inner conductor providing RF output terminals respectively coupled to said anode structure and said cathode structure for removing RF energy from said axially extending space utilizing said cathode structure as a probe interacting with said RF fields.

64. A microwave assembly comprising a crossed-field discharge device for operating at a predetermined frequency and including an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, means for establishing an axially extending RF wave in said axially extending space and having associated therewith RF electrical fields and RF magnetic fields normal to the axis of said device and extending into said interaction space, and end structures closing the ends of said anode structure and said axially extending space, said anode structure including an annular anode connection extending outwardly beyond one of said end structures and said cathode structure including a cathode connection extending outwardly beyond said one end structure and disposed within said annular anode connection; and a microwave coupling structure including a first annular outer conductor connected to said anode connection, a first inner conductor disposed within said first annular outer conductor and connected to said cathode connection, said first outer conductor and said first inner conductor providing RF input terminals to said coupling structure, a second annular outer condutcor extending from and angularly disposed with respect to said first outer conductor, a second inner conductor connected to said first inner conductor and extending into said second outer conductor, first and second DC input terminals for said coupling structure, means interconnecting said second outer conductor and said first DC input terminal to provide a DC connection therebetween and to said anode connection, an RF rejection filter interconnecting said second inner conductor and said second DC input terminal to provide a DC connection therebetween and to said cathode connection while preventing RF coupling therebetween, an RF by-pass filter connected between said DC input terminals providing a low impedance path for the predetermined frequency and the higher frequencies, a third annular outer conductor concentrically arranged with respect to said first outer conductor and electrically insulated therefrom and capacitively coupled thereto, and an annular inner conductor having said first inner conductor extending thereinto and electrically insulated therefrom and capacitively coupled thereto, said third annular outer conductor overlapping said first outer conductor a distance equivalent to ¼ of the wavelength of the predetermined frequency and said annular inner conductor overlapping said first inner conductor a distance equal to ¼ of the wavelength of the predetermined frequency to establish an RF by-pass filter connection between said RF input terminals providing a low impedance path for the second and higher harmonics of the predetermined frequency, said third outer conductor and said annular inner conductor providing RF output terminals respectively coupled to said anode structure and said cathode structure for removing RF energy from said axially extending space utilizing said cathode structure as a probe interacting with said RF fields.

65. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, and end structures enclosing the ends of said anode structure and said axially extending space, said anode structure and said rods and said interconnecting means defining a frequency determining resonant cavity having an axial extent of substantially one-half of the wavelength of the operating frequency of said device.

66. A crossed-field discharge device comprising an anode structure defining an axially extending space, a plurality of axially extended anode segments on said anode structure and projecting radially into said axially extending space and providing a corresponding plurality of axially extending anode recesses therebetween, a pair of pole pieces respectively arranged adjacent to the opposite ends of said anode structure and including portions overlying and in axial alignment with said anode recesses, a plurality of rods each having both ends thereof mounted on said portions of the adjacent pole pieces and respectively extending axially in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emisive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space.

67. A crossed-field discharge device comprising an anode structure defining an axially extending space, a plurality of axially extending anode segments on said anode structure and projecting radially into said axially extending space and providing a corresponding plurality of axially extending anode recesses therebetween, a pair of pole pieces respectively arranged adjacent to the opposite ends of said anode structure and including portions overlying and in axial alignment with said anode recesses, a plurality of rods respectively mounted on said portions of said pole pieces and respectively extending axially in said anode recesses and respectively spaced from the adjacent ones of said anode segments, at least one of said pole pieces being electrically conductive and electrically interconnecting said rods at corresponding ends thereof, an axially extending cathode structure disposed in said axially extending space and cooperating with said anode structure to define an axially extending annular interaction space said cathode structure including an electron emissive element disposed within said anode structure and adjacent to the inner portion of said interaction space, said anode structure and said rods in the operation of said device cooperating to provide a portion of a coaxial transmission line for accommodating an axially extending RF wave therein, means electrically interconnecting said anode structure and said rods at the adjacent corresponding ends thereof and terminating the coaxial transmission line provided thereby to define a frequency determining resonant cavity for said device, and end structures enclosing the ends of said anode structure and said axially extending space.

68. A crossed-field discharge device comprising an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof, an axially extending cathode structure disposed in said axially extending spaced and cooperating with said anode structure to define an axially extending annular interaction space, said cathode structure including an electron emissive element disposed within said anode structure and adjacent to the inner portion of said interaction space, and end structures enclosing the ends of said anode structure and said axially extending space, said anode structure and said rods and said interconnecting means defining a frequency determining resonant cavity for said device accommodating an axially extending RF wave therein, wherby there are RF electrical fields between said anode structure and said cathode structure and between said rods and said cathode structure and extending inwardly into said interaction space and having associated therewith annular RF magnetic fields about said rods and extending inwardly into said interaction space.

69. A crossed-field discharge device comprising an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, means for establishing a unidirectional magnetic field extending axially through said interaction space, and end structures enclosing the ends of said anode structure and said axially extending space, said anode structure and said rods in the operation of said device cooperating with said cathode structure to provide a portion of a coaxial transmission line for accommodating an axially extending RF wave in said device.

70. A crossed-field discharge device comprising an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, an axially extending cathode structure disposed in said axially extending space and cooperating with said anode structure to define an axially extending annular interaction space, said cathode structure including an electron emissive element disposed within said anode structure and adjacent to the inner portion of said interaction space, means electrically interconnecting said anode structure and said rods at the adjacent corresponding ends thereof and terminating the coaxial transmission line provided thereby to define a frequency determining resonant cavity for said device, said anode structure and said rods in the operation of said device cooperating with said cathode structure to provide a portion of a coaxial transmission line for accommodating an axially extending RF wave in said resonant cavity, and end structures enclosing the ends of said anode structure and said axially extending space.

71. A crossed-field discharge device comprising an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, both said anode segments and said rods receiving electrons from said cathode structure and cooperating therewith to define the fields in said interaction space, and end structures enclosing the ends of said anode structure and said axially extending space, said anode structure and said rods and said interconnecting means defining a frequency determining resonant cavity for said device.

(References on following page)

References Cited

UNITED STATES PATENTS

| | | | |
|---|---|---|---|
| 2,592,206 | 4/1952 | Sproull | 315—39.51 X |
| 2,782,342 | 2/1957 | Kilgore | 315—39.53 X |
| 2,819,449 | 1/1958 | Herold | 315—39 X |
| 2,869,012 | 1/1959 | Muller | 313—157 X |
| 3,027,488 | 3/1962 | Winsor | 315—39.77 X |
| 3,273,011 | 9/1966 | Brown | 315—39 |
| 3,305,751 | 2/1967 | Brown | 315—39.51 X |
| 3,312,859 | 4/1967 | Wilbur et al. | 315—39 |

HERMAN KARL SAALBACH, Primary Examiner

SAXFIELD CHATMAN, Jr., Assistant Examiner

U.S. Cl. X.R.

313—157, 338; 315—39.51, 39.53, 39.77, 39.75; 328—227; 330—47; 331—86